United States Patent
Onuki et al.

(10) Patent No.: US 11,697,743 B2
(45) Date of Patent: Jul. 11, 2023

(54) INK COMPOSITION, WRITING INSTRUMENT AND METHOD FOR PRODUCING INK COMPOSITION

(71) Applicant: PENTEL KABUSHIKI KAISHA, Tokyo (JP)

(72) Inventors: Sachiko Onuki, Saitama (JP); Kiyonori Yasuike, Saitama (JP); Haruka Takai, Saitama (JP); Hiroyuki Saitou, Ibaraki (JP)

(73) Assignee: PENTEL KABUSHIKI KAISHA

( * ) Notice: Subject to any disclaimer, the term of this patent is extended or adjusted under 35 U.S.C. 154(b) by 1020 days.

(21) Appl. No.: 16/464,607

(22) PCT Filed: Jun. 14, 2017

(86) PCT No.: PCT/JP2017/022021
§ 371 (c)(1),
(2) Date: May 28, 2019

(87) PCT Pub. No.: WO2018/105151
PCT Pub. Date: Jun. 14, 2018

(65) Prior Publication Data
US 2021/0095144 A1  Apr. 1, 2021

(30) Foreign Application Priority Data

Dec. 5, 2016  (WO) .................. PCT/JP2016/086106

(51) Int. Cl.
*C09D 11/17* (2014.01)
*B43K 7/02* (2006.01)
(Continued)

(52) U.S. Cl.
CPC ............... *C09D 11/17* (2013.01); *B43K 7/02* (2013.01); *C08K 3/04* (2013.01); *C08K 5/053* (2013.01);
(Continued)

(58) Field of Classification Search
None
See application file for complete search history.

(56) References Cited

U.S. PATENT DOCUMENTS 9,493,668 B2 * 11/2016 Clayton ................. C09D 11/18
2005/0166795 A1    8/2005 Ito et al. .................... 106/31.58
(Continued)

FOREIGN PATENT DOCUMENTS

| CN | 102292403 | 12/2011 |
| CN | 102675985 | 9/2012 |

(Continued)

OTHER PUBLICATIONS

Written Opinion of the International Search Authority dated Feb. 7, 2017 issued in International Application No. PCT/JP2016/086106.
(Continued)

*Primary Examiner* — Nicole M. Buie-Hatcher
(74) *Attorney, Agent, or Firm* — Adams & Wilks

(57) ABSTRACT

An ink composition contains a carbon black and/or an organic pigment, water, a polysaccharide, two or more of diols, and particles of an acrylic resin. The two or more of diols include a first diol having from 5 to 7 carbon atoms and a second diol having from 1 to 4 carbon atoms, and a content of the first diol in the ink composition is 0.05 wt % or more.

13 Claims, 6 Drawing Sheets

(51) Int. Cl.
*C08K 3/04* (2006.01)
*C08K 5/053* (2006.01)
*C08L 5/00* (2006.01)
*C09D 11/18* (2006.01)
*C08L 25/06* (2006.01)
*C08L 33/02* (2006.01)

(52) U.S. Cl.
CPC ................ *C08L 5/00* (2013.01); *C08L 25/06* (2013.01); *C08L 33/02* (2013.01); *C09D 11/18* (2013.01); *C08K 2201/005* (2013.01)

(56) References Cited

U.S. PATENT DOCUMENTS

| | | | |
|---|---|---|---|
| 2005/0228070 A1 | 10/2005 | Ichikawa et al. | 523/160 |
| 2010/0162921 A1 | 7/2010 | Omatsu et al. | 106/31.7 |
| 2011/0271870 A1 | 11/2011 | Otsubo et al. | 106/31.13 |
| 2012/0306977 A1 | 12/2012 | Komatsu | 647/100 |
| 2013/0087070 A1 | 4/2013 | Itou et al. | 106/31.28 |

FOREIGN PATENT DOCUMENTS

| | | | | |
|---|---|---|---|---|
| CN | 102807784 | | 12/2012 | |
| CN | 102947400 | | 2/2013 | |
| GB | 1414575 | | 11/1975 | |
| JP | 6346014 | | 12/1994 | |
| JP | 2005187486 A | * | 7/2005 | |
| JP | 2005232360 A | * | 9/2005 | |
| JP | 2006193688 | | 7/2006 | |
| JP | 2007177011 | | 7/2007 | |
| JP | 2007177023 A | * | 7/2007 | |
| JP | 2009126941 | | 6/2009 | |
| JP | 2014224248 | | 12/2014 | |
| JP | 2016053132 | | 4/2016 | |
| JP | 2016102180 | | 6/2016 | |
| JP | 2017106004 | | 4/2017 | |
| JP | 2017082154 A | * | 5/2017 | |
| WO | 03091348 | | 11/2003 | |
| WO | WO-2011115046 A1 | * | 9/2011 | ........... H04N 19/107 |
| WO | WO-2016047434 A1 | * | 3/2016 | ............. C09D 11/16 |

OTHER PUBLICATIONS

Written Opinion of the International Search Authority dated Jul. 11, 2017 issued in International Application No. PCT/JP2017/022021.

Second Office Action dated Dec. 17, 2021 in Chinese counterpart Application No. 201780074638.1 with English-language machine translation.

Japanese Office Action dated Jan. 26, 2021 in Application No. 2018-554808 together with English-language machine translation.

Indian Office Action dated Jan. 27, 2021 in Application No. 201917018367.

Hearing Notice With Objections issued Dec. 9 2021 in Indian counterpart Application No. 201917018367 with English-language machine translation.

Office Action dated Jul. 19, 2021 in Chinese Application No. 201780074638.1.

* cited by examiner

INK COMPOSITION, WRITING INSTRUMENT AND METHOD FOR PRODUCING INK COMPOSITION

TECHNICAL FIELD

The present disclosure relates to an ink composition, a writing instrument, and a method for producing an ink composition.

BACKGROUND

In a water-based ink composition, a diol-based solvent may be used in order to improve a drying property of a writing line.

For example, Patent Document 1 discloses a rollerball ink composition which contains a diol (polyhydric alcohol) having 4 or more carbon atoms and a specific weight of less than 1.00 (25° C.) as a material for improving a drying property of a writing line.

CITATION LIST

Patent Literature

Patent Document 1: JP2006-193688A

SUMMARY

Technical Problem

In general, a quicker-drying dial-based solvent is high in permeability into an object to be written such as a paper surface or cloth. Therefore, when ink containing the diol-based solvent is adhered to the object to be written, a coloring component such as a pigment may diffuse on the object to be written or in the object to be written as a liquid component of the ink permeates into the object to be written, causing ink bleed.

In view of the above, an object of at least one embodiment of the present disclosure is to provide an ink composition, a writing instrument, and a method for producing an ink composition, which can achieve both a quick-drying property and bleed suppression of ink.

Solution to Problem (1) An ink composition according to at least one embodiment of the present invention contains:
 a carbon black and/or an organic pigment;
 water;
 a polysaccharide;
 two or more of diols; and
 particles of an acrylic resin,
 wherein the two or more of diols include:
 a first diol having from 5 to 7 carbon atoms; and
 a second diol having from 1 to 4 carbon atoms, and
 wherein a content of the first diol in the ink composition is 0.05 wt % or more.

Permeability to an object to be written such as a paper surface or cloth of a diol having an excellent quick-drying property varies depending on the type thereof. In this regard, in the ink composition according to the above (1), the two or more of diols are used, and the first diol having from 5 to 7 carbon atoms and the second diol having from 1 to 4 carbon atoms are used as the two or more of diols, and the content of the first diol in the ink composition is 0.05 wt % or more. As described above, since the first diol having relatively high permeability and the second dial having relatively low permeability are used, permeability is easily adjusted within an appropriate range while maintaining a quick-drying property of a liquid component of ink, making it possible to suppress ink bleed. In addition, in the ink composition according to the above (1), since the particles of the acrylic resin are adhered and fixed to the object to be written when writing on the object to be written, it is possible to suppress diffusion of the carbon black and/or organic pigment associated with permeation of the liquid component of the ink into the object to be written. That is, the particles of the acrylic resin adhered and fixed to the object to be written restrict movement of the carbon black and/or organic pigment on the object to be written or in the object to be written, making it possible to have the carbon black and/or the organic pigment stay in the vicinity of a writing position on the object to be written, and to effectively suppress ink bleed. Therefore, with the ink composition according to the above (1), it is possible to achieve both the quick-drying property and bleed suppression of the ink.

(2) In some embodiments, in the above configuration (1), a content of the two or more of dials in an organic solvent used for the ink composition is 50.0 wt % or more.

With the above configuration (2), since the content of the two or more of dials in the organic solvent used is 50.0 wt % or more, ink is discharged stably at the time of writing, which facilitates suppressing degradation in quick-drying property owing to so-called ink dripping which is caused by ink lumped and applied onto a paper surface.

(3) In some embodiments, in the above configuration (1) or (2), the first diol may be an alkanediol having from 5 to 6 carbon atoms, and the second dial may be an alkanediol having from 2 to 4 carbon atoms.

With the configuration according to the above (3), since the alkanediol having relatively high permeability and from 5 to 6 carbon atoms, and the alkanediol having relatively low permeability and from 2 to 4 carbon atoms are used as the two or more of diols, ink permeability is easily adjusted within an appropriate range while maintaining the quick-drying property of the ink, and ink bleed is easily suppressed.

(4) In some embodiments, in any one of the above configurations (1) to (3), the first dial may be 2-methylpentane-2,4-diol.

With the configuration according to the above (4), since 2-methylpentane-2,4-diol is used as the first diol having relatively high permeability, the quick-drying property of the ink is easily maintained.

(5) In some embodiments, in any one of the above configurations (1) to (4), the ink composition contains 5.0 wt % or more and 25.0 wt % or less of the first diol, and 3.0 wt % or more and 10.0 wt % or less of the second diol.

(6) In some embodiments, in the above configuration (5), the ink composition contains 8.0 wt % or more and 22.0 wt % or less of the first diol, and 4.0 wt % or more and 8.0 wt % or less of the second diol.

With the configuration according to the above (5) or (6), the content ratio of the first dial and the second diol in the ink composition becomes moderate, making it possible to have moderate permeability for ink composition.

(7) In some embodiments, in any one of the above configurations (1) to (6), an average particle size of the particles of the acrylic resin is 0.04 μm or more and 0.10 μm or less.

In the above configuration (7), since the average particle size of the particles of the acrylic resin is 0.04 μm or more, the particles of the acrylic resin are easily adhered and fixed to the object to be written without being permeated into the object to be written with the liquid component, making it possible to suppress diffusion of the carbon black and/or organic pigment in the ink composition. In addition, in the above configuration (7), since the average particle size of the particles of the acrylic resin is 0.10 μm or less, the particles are captured in a fine structure of the object to be written (for example, gaps between fibers if the object to be written is paper), making the particles easily be fixed to the object to be written. Therefore, with the above configuration (7), it is possible to effectively suppress diffusion of the carbon black and/or organic pigment.

(8) In some embodiments, in any one of the above configurations (1) to (7), the acrylic resin may include a styrene-acrylic acid resin.

In the above configuration (8), since the acrylic resin is the styrene-acrylic acid resin, a smooth coating film can be formed on a writing line surface, and it is possible to effectively suppress diffusion of the carbon black and/or organic pigment by having the carbon black and/or the organic pigment stay on the coating film.

(9) In some embodiments, in any one of the above configurations (1) to (8), the particles of the acrylic resin have a solid acid value of 50 or more and less than 100.

In the above configuration (9), since the particles of the acrylic resin have the solid acid value of 50 or more, it is likely that good compatibility between the water and the diols is obtained. In addition, in the above configuration (9), the particles of the acrylic resin have the solid acid value of less than 100, dispersion of the particles of the acrylic resin in the ink composition is stabled easily, making it possible to suppress diffusion of the black carbon and/or organic pigment over a long period of time.

(10) In some embodiments, in any one of the above configurations (1) to (9), a ratio by weight of a content of the particles of the acrylic resin to a content of the two or more of diols in the ink composition is 0.0084 or more and 0.21 or less.

With the above configuration (10), since the ratio by weight of the content of the particles of the acrylic resin to the content of the two or more of diols is 0.0084 or more and 0.21 or less, movement of the carbon black and/or organic pigment in the object to be written is restricted easily while maintaining the quick-drying property of the liquid component of the ink composition. Therefore, with the ink composition according to the above (10), it is possible to achieve both the quick-drying property and bleed suppression of the ink.

(11) In some embodiments, in any one of the above configurations (1) to (10), a ratio by weight of a content of the particles of the acrylic resin to a content of the two or more of diols in the ink composition is 0.084 or more and 0.05 or less.

With the above configuration (11), since the ratio by weight of the content of the particles of the acrylic resin to the content of the two or more of diols is 0.084 or more and 0.05 or less, an appropriate addition amount suppresses pigment agglomeration with simultaneous restriction of movement of the carbon black and/or organic pigment in the object to be written while maintaining the quick-drying property of the liquid component of the ink composition, and thus degradation in quick-drying property owing to so-called ink dripping which is caused by ink lumped and applied onto the paper surface is suppressed. Therefore, with the ink composition according to the above (11), both the quick-drying property and bleed suppression of the ink are achieved more easily.

(12) In some embodiments, in any one of the above configurations (1) to (11), the ink composition further contains at least one of alumina, silicon carbide, chromium oxide, boron carbide, zircon, tungsten carbide, silica, diamond, aluminum nitride, or silicone nitride.

With the above configuration (12), the particles of the acrylic resin are fixed to the object to be written, and at least one of alumina, silicon carbide, chromium oxide, boron carbide, zircon, tungsten carbide, silica, diamond, aluminum nitride, or silicone nitride enters gaps of the object to be written (for example, gaps between paper surface fibers), making it possible to express a sealing effect. Thus, it is possible to restrict movement of the carbon black and/or organic pigment more effectively, and to suppress ink bleed more effectively.

(13) In some embodiments, in any one of the above configurations (1) to (12), the ink composition has a viscosity of at least 50 mPa·s and at most 10,000 mPa·s at a temperature of 25° C. and at a shear rate of 0.35 sec$^{-1}$, and a viscosity of at least 50 mPa·s and at most 1,000 mPa·s at a temperature of 25° C. and at a shear rate of 35 sec$^{-1}$.

If the ink composition has the viscosities within the ranges according to the above (13), the carbon black and/or the organic pigment is likely to remain on the surface of the object to be written when the ink composition is adhered to the object to be written, resulting in diols soaking into the object to be written and resin emulsion being fixed to the object to be written. Thus, according to the above configuration (13), it is possible to suppress ink bleed more effectively.

(14) A writing instrument according to at least one embodiment of the present invention includes:

a writing part; and an ink storage part storing the ink composition according to any one of the above (1) to (13), wherein the writing instrument is configured such that the ink composition is supplied to the writing part from the ink storage part.

In the ink composition used for the writing instrument according to the above (14), using the two or more of diols, it is possible to suppress ink bleed by keeping permeability within an appropriate range while maintaining a quick-drying property of a liquid component of ink. In addition, in the ink composition used for the writing instrument according to the above (14), since particles of an acrylic resin are adhered and fixed to an object to be written when writing on the object to be written, it is possible to suppress diffusion of the carbon black and/or organic pigment associated with permeation of the liquid component of the ink into the object to be written. That is, the particles of the acrylic resin adhered and fixed to the object to be written restrict movement of the carbon black and/or organic pigment on the object to be written or in the object to be written, making it possible to have the carbon black and/or the organic pigment stay in the vicinity of a writing position on the object to be written, and to effectively suppress ink bleed. Therefore, with the writing instrument according to the above (14), it is possible to achieve both the quick-drying property and bleed suppression of the ink.

(15) A method for producing an ink composition according to at least one embodiment of the present invention includes a step of dispersing, in water, a carbon black and/or an organic pigment, a polysaccharide, two or more of diols, and particles of an acrylic resin, wherein the two or more of diols include a first diol having from 5 to 7 carbon atoms and a second diol having from 1 to 4 carbon atoms, and a content of the first diol in the ink composition is 0.05 wt % or more.

In the ink composition obtained by the producing method according to the above (15), the two or more of diols are used, the two or more of diols include the first diol having from 5 to 7 carbon atoms and the second diol having from 1 to 4 carbon atoms, and the content of the first diol in the ink composition is 0 05 wt % or more. Thus, it is possible to suppress ink bleed by keeping the permeability within an appropriate range while maintaining a quick-drying property of the liquid component of the ink. In addition, in the ink composition obtained by the producing method according to the above (15), since the particles of the acrylic resin are adhered and fixed to the object to be written when writing on the object to be written, it is possible to suppress diffusion of the carbon black and/or organic pigment associated with permeation of the liquid component of the ink into the object to be written. That is, the particles of the acrylic resin adhered and fixed to the object to be written restrict movement of the carbon black and/or organic pigment on the object to be written or in the object to be written, making it possible to have the carbon black and/or the organic pigment stay in the vicinity of a writing position on the object to be written, and to effectively suppress ink bleed. Therefore, with the producing method according to the above (15), it is possible to obtain the ink composition which can achieve both the quick-drying property and bleed suppression of the ink.

Advantageous Effects

According to at least one embodiment of the present invention, provided is an ink composition, a writing instrument, and a method for producing the ink composition, which can achieve both quick-drying property and bleed suppression of ink.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

Figure 1:
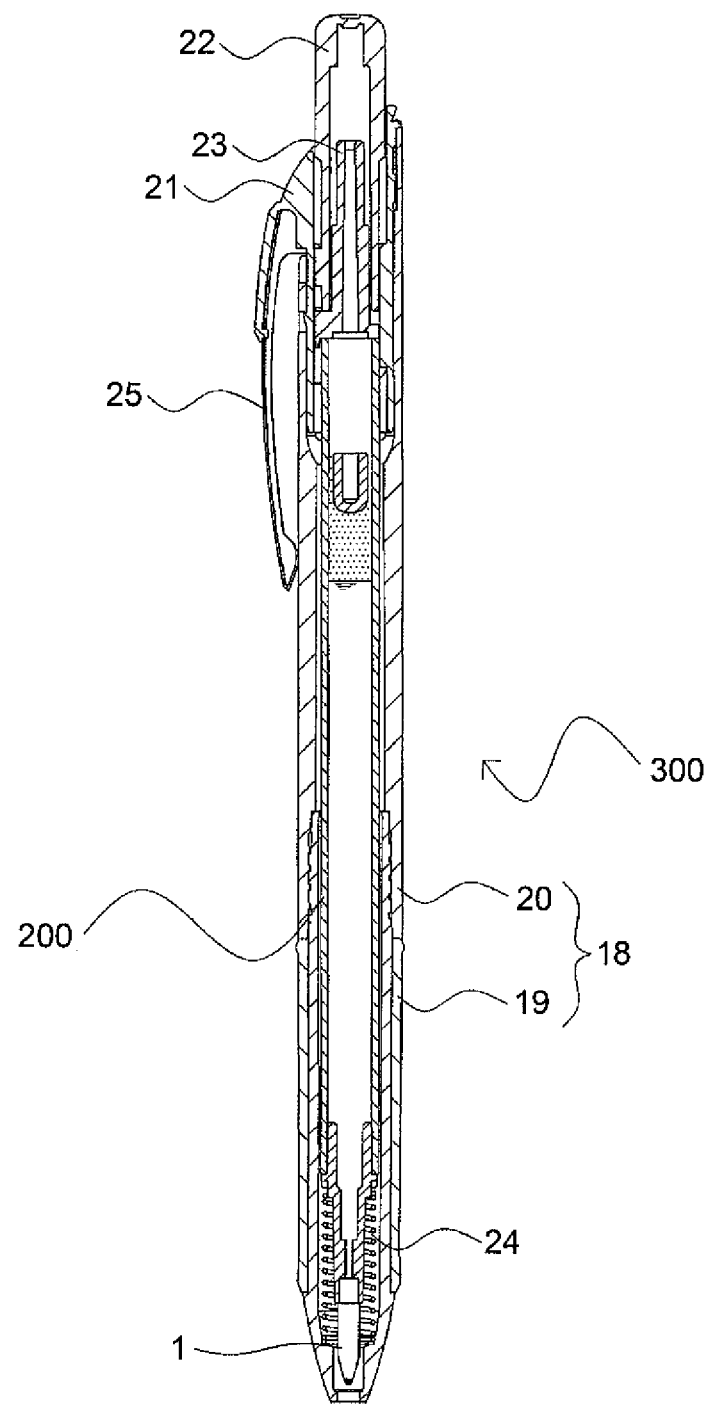
FIG. 1 is a vertical sectional view illustrating a writing instrument according to one embodiment.
Figure 2:
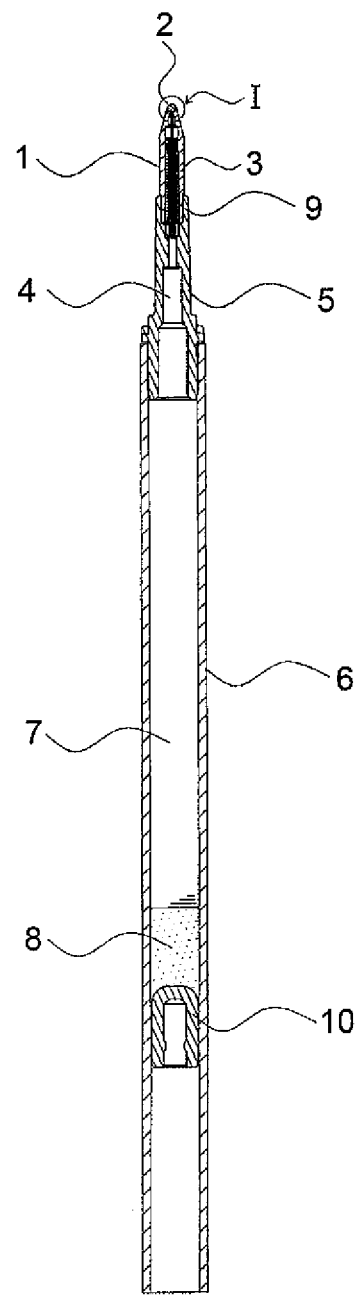
FIG. 2 is a vertical sectional view illustrating a refill used for the writing instrument illustrated in FIG. 1.

FIG. 1 is a vertical sectional view illustrating a writing instrument according to one embodiment. FIG. 2 is a vertical sectional view illustrating a refill portion of the writing instrument illustrated in FIG. 1.

As illustrated in FIG. 2, a writing instrument 100 contains a writing part which is a ballpoint pen tip 1 and an ink storage part which is an ink storage tube 6 in which ink 7 to be supplied to the ballpoint pen tip 1 (writing part) is retained.

In the embodiment illustrated in FIGS. 1 and 2, the writing instrument 100 is a ballpoint pen. However, the writing instrument 100 according to other embodiments is not particularly limited as far as the writing instrument has a structure that allows drawing, and may be any writing instrument such as a brush pen or a marker pen. The ink 7 is an ink for a ballpoint pen in the embodiment illustrated in FIGS. 1 and 2. However, the ink 7 according to other embodiments may be an ink for marker pens, an ink for brush pens and the like.

In the exemplary embodiment illustrated in FIG. 1 and FIG. 2, the writing instrument 100 contains a refill 200 and an extrapolation body 300.

The writing instrument 100 according to the embodiment illustrated in FIG. 1 is a retractable writing instrument containing the refill 200 in a shaft tube of the extrapolation body 300 that is configured to retractably have a tip from a distal hole. FIG. 1 illustrates the writing instrument 100 in a state in which a tip of the refill 200 is accommodated inside the distal hole of the shaft tube.

The extrapolation body 300 includes a shaft tube 18. A front shaft 19 and rear shaft 20 of the shaft tube 18 is detachably fixed by screwing. A crown 21 is attached and fixed to a rear part of the rear shaft 20 by screwing a recessed portion and protruding portion thereof while being inserted into an inner hole of the rear shaft 20. A portion externally exposed from the rear end of the rear shaft 20 is disposed so as to cover the surface of a base portion of a clip 25 mounted to an outer surface of the rear shaft 20. In addition, the crown 21 has a tubular shape and a groove formed inside thereof. The groove serves as a cam groove of a debit cam mechanism, regulating a sliding position of an interior rotor 23 and defining a forward-and-backward moving position of the refill 200 articulated to the rotor 23 as the rotor 23 is rotated by an operation of pushing in a knob 22.

In the shaft tube 18, the refill 200 is disposed to be movable back and forth. In front of the refill 200, a snapping member 24 including a coil spring or the like is disposed, biasing the refill 200 backward. A rear end part of the refill 200 abuts on a distal part of the rotor 23. That is, a retractable writing instrument is obtained where the refill 200 projects from a distal opening of the shaft tube 18 by an operation of pressing the knob 22.

As illustrated in FIG. 2, the refill 200 contains a ballpoint pen tip 1 that includes a ball 2 and a ball holder 3 rotatably holding the ball 2; and an ink storage tube 6 connected to the ballpoint pen tip 1 through a tip holder 5 having a through-hole 4 formed therein. The ball holder 3 holds the ball 2 while partially protruding from a distal opening of an ink hole formed in the ball holder 3. The ink storage tube 6 stores the ink 7 therein, and an ink backward-flow preventing agent 8 that is not compatible with the ink 7 is disposed so as to be in contact with the rear end interface of the ink 7. A ballpoint pen may be formed without an extrapolation body 300 by disposing a tail plug or the like that prevents leakage of the ink 7 at a rear end of the ink storage tube 6 in the refill 200.

Figure 3:
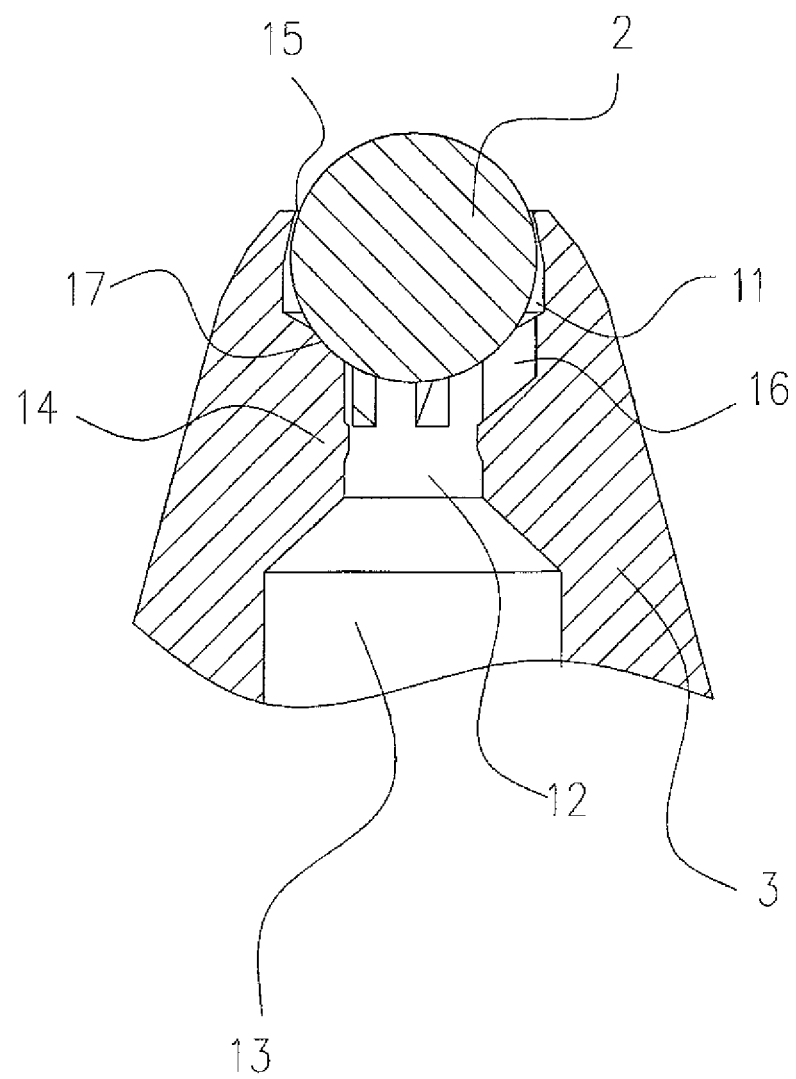
FIG. 3 is a grossly enlarged sectional view illustrating I part in FIG. 2.

FIG. 3 illustrates the structure of the ballpoint pen tip 1 in the refill 200 according to one embodiment and is a grossly enlarged vertical sectional view of I part in FIG. 2. A coil spring 9 is not illustrated.

In an exemplary embodiment illustrated in FIG. 3, the ball holder 3 has a through-hole formed as an ink passage on a tubular material made of metal by using a drill or the like, and has a ball house part 11, a middle hole 12, and a rear hole 13 in this order from the distal side. An inward projection 14 is formed between the ball house part 11 and the rear hole 13. A distal opening 15 of the ball house part 11 has a diameter that is reduced by caulking, and the distal opening 15 having a reduced diameter and the distal opening 14 define the region where the ball 2 can move from back to front and from side to side. By annularly disposing a plurality of inward projections 14 at regular intervals, a radial groove 16 through which the ink 7 passes is formed between the distal opening 14 and a neighboring inward projection. The radial groove 16 is formed by cutting after processing the ball house part 11, the middle hole 12, and the rear hole 13. The radial groove 16 penetrates the inward projection 14 and communicates to the rear hole 13, thereby securing the supply of the ink 7 to the ball house part 11. Alternatively, the radial groove 16 may extend to the middle hole 12 without penetrating the middle hole 12.

A coil spring 9 (see FIG. 2) may be disposed behind the ball 2 to press the ball 2 to an internal edge of the distal opening of the inner ball holder 3, thereby sealing the ink hole in no use to prevent leakage of ink from the distal end of the ballpoint pen tip or preventing movement of the ink at the time of receiving an impact by dropping or leaving a writing instrument with the nib facing upwards. The load of the coil spring 9 pressing the ball 2 is desirably 0.01 N or more and 1.50 N or less.

The retractable writing instrument has been described above as an example of the writing instrument. However, the writing instrument may be a cap type writing instrument with a cap. Alternatively, the writing instrument according to some embodiments may be a writing instrument configured to assist discharge of the ink composition during writing by pressure from compressed gas or the like.

In some embodiments, the ink 7 is formed with an ink composition containing a carbon black and/or an organic pigment, water, a polysaccharide, two or more of diols, and particles of an acrylic resin. The two or more of diols include the first diol having from 5 to 7 carbon atoms and the second diol having from 1 to 4 carbon atoms. The content of the first diol in the ink composition is 0.05 wt % or more.

In general, a quicker-drying diol-based solvent is high in permeability into an object to be written such as a paper surface or cloth. Therefore, when ink containing the diol-based solvent is adhered to the object to be written, a coloring component such as a pigment may diffuse on the object to be written or in the object to be written as a liquid component of the ink permeates into the object to be written, causing ink bleed.

In this regard, the above-described ink composition uses the two or more of diols different in permeability into the object to be written such as the paper surface or the cloth, and uses, as the two or more of diols, the first diol having from 5 to 7 carbon atoms and the second diol having from 1 to 4 carbon atoms. The content of the first diol in the ink composition is 0.05 wt % or more. Thus, it is possible to suppress ink bleed by keeping the permeability within an appropriate range while maintaining a quick-drying property of the liquid component of the ink. It is also possible to suppress diffusion of the carbon black and/or organic pigment associated with permeation of the liquid component of the ink into the object to be written because in the above-described ink composition, the particles of the acrylic resin are adhered and fixed to the object to be written when writing on the object to be written. That is, the particles of the acrylic resin adhered and fixed to the object to be written restrict movement of the carbon black and/or organic pigment on the object to be written or in the object to be written, making it possible to have the carbon black and/or the organic pigment stay in the vicinity of a writing position on the object to be written, and to effectively suppress ink bleed. Therefore, according to the above-described ink composition, it is possible to achieve both the quick-drying property and bleed suppression of the ink.

An acrylic resin is blended in order to suppress diffusion of a pigment/ink bleed. In addition, the first diol is blended in order to improve the quick-drying property. However, compatibility between the acrylic resin and the first diol is not good. After preparing the ink composition, the compatibility is worsened from the beginning, the drying property of a writing line is degraded by ink dripping, and gelatinization occurs with time, making writing impossible. Therefore, conventionally, the acrylic resin and the first diol could not effectively be used in combination. In this regard, in the above-described ink composition, adding the second diol, the second diol plays a role as mediator between the acrylic resin and the first diol, which makes it possible to simultaneously obtain effects of improving temporal stability and the quick-drying property, preventing pigment diffusion, and suppressing ink bleed. Accordingly, the content of the first dial in the ink composition is set at 0.05 wt % or more.

As the two or more of diols, it is possible to use two or more of, for example, alkanediols such as ethylene glycol, propylene glycol, butylenediol, 1,3-butylene glycol, 2-methylpentane-2,4-diol, 1,3-butanediol, 1,4-butanediol, 2,3-butanediol, 1,2-hexanediol, 3-methyl-1,3-butanediol, 1,2-propanediol, and 1,3-propanediol, polyalkylene glycol such as diethylene glycol, triethylene glycol, dipropylene glycol, and tripropylene glycol, thioglycols such as thiodiethylene glycol, or diol other than alkane such as propylene glycol monomethyl ether, acetylenic glycol, and diethylene glycol.

In some embodiments, as the two or more of diols, at least one of the first diols having from 5 to 7 carbon atoms and at least one of the second diols having from 1 to 4 carbon atoms may be used.

A diol having more carbon atoms tends to have higher permeability into a paper surface or cloth. This is considered because a diol having more carbon atoms tends to have higher hydrophobicity or a diol having the increasing number of carbon atoms tends to have lower surface tension.

In this regard, as described above, using, as the two or more of diols, the first diol having relatively more carbon atoms and high permeability, and the second diol having relatively few carbon atoms and low permeability facilitates adjustment of ink permeability within an appropriate range and suppression of ink bleed while maintaining the quick-drying property of the ink.

If a diol has 7 or less carbon atoms, the diol has relatively high solubility in water used as a solvent and is thus easily be used as a material for the ink composition.

In some embodiments, the first diol may be an alkanediol having from 5 to 6 carbon atoms, and the second diol may be an alkanediol having from 2 to 4 carbon atoms.

More specifically, an example that may be used as the first diol includes 2-methylpentane-2,4-diol, 1,2-hexanediol, 3-methyl-1,3-butanediol, or the like.

In addition, an example that may be used as the second diol includes ethylene glycol, propylene glycol, 1,2-propanediol, 1,3-propanediol, 1,3-butanediol, 1,4-butanediol, 2,3-butanediol, or the like.

As described above, the alkanediol having relatively high permeability and from 5 to 6 carbon atoms is used as the first diol, and the alkanediol having relatively low permeability and from 2 to 4 carbon atoms is used as the second diol, facilitating adjustment of ink permeability within the appropriate range and suppression of ink bleed while maintaining the quick-drying property of the ink.

With respect to the acrylic resin and a diol other than the alkanediol, the acrylic resin is slightly agglomerated after preparing the ink composition, and an average particle size of the acrylic resin tends to increase. With respect to the alkanediol and the acrylic resin, however, the acrylic resin is not agglomerated even after preparing the ink composition, and the average particle size of the acrylic resin remains unchanged, which is thus preferred.

Alternatively, 2-methylpentane-2,4-diol can suitably be used as the first diol. In this case, the quick-drying property of ink is maintained easily, in particular.

In the ink composition, it is preferable that the content of the first diol is 5.0 wt % or more and 25.0 wt % or less, and the content of the second diol is 3.0 wt % or more and 10.0 wt % or less, or it is more preferable that the content of the first diol is 8.0 wt % or more and 22.0 wt % or less, and the content of the second dial is 4.0 wt % or more and 8.0 wt % or less.

If the contents of the first diol and second diol in the ink composition fall within the above-described ranges, the content ratio of the first diol and the second diol in the ink composition becomes moderate, making it possible to have moderate permeability for ink composition.

The content ratio of the first diol to the second diol in the ink composition (the content of the first diol/the content of the second diol) is preferably 1.5 or more and 5.0 or less.

If the content ratio of the first diol to the second diol in the ink composition falls within the above-described range, it is possible to have moderate permeability for ink composition.

In some embodiments, the content of the two or more of diols in an organic solvent used for the ink composition may be 50.0 wt % or more.

If the content of the two or more of diols in the organic solvent used for the ink composition is 50.0 wt % or more, ink is discharged stably at the time of writing, which facilitates suppressing degradation in quick-drying property owing to so-called ink dripping which is caused by ink lumped and applied onto a paper surface. Moreover, because of good compatibility between the first diol and the second diol, low permeability of the second diol is alleviated easily, and the quick-drying property of ink is maintained more easily than in a case in which the usage rate of the organic solvent other than the diol is high.

An organic solvent other than the above-described two or more of diols may be, for example, alcohol such as 3-methyl-3-methoxy-1-butanol or glycerin.

In addition, the ratio by weight of water in the ink composition to the organic solvent containing the two or more of diols (the weight of the water/the weight of the organic solvent) may be 1.5 or more and 8.0 or less. If the ratio by weight of the water in the ink composition to the organic solvent containing the two or more of diols (the weight of the water/the weight of the organic solvent) is less than 1.5, performance failures may occur, which include, for example, an ink discharge defect and a middle-missing writing line caused by temporally thickening ink. If the ratio by weight is more than 5.0, a failure may occur, which includes the worsened drying property of a writing line or degraded dispersion stability of ink after the ink is frozen and thawed again.

As the particles of the acrylic resin, for example, particles of an acrylic resin, acrylic acid ester resin, styrene-acrylic acid resin (styrene-acrylic acid copolymers), and the like can be used.

The particles of the acrylic resin may be available as particles included in emulsion.

The average particle size of the particles of the acrylic resin is preferably 0.04 µm or more and 0.10 µm or less, or more preferably 0.07 µm or more and 0.09 µm or less. The average particle size of the particles of the acrylic resin is measured by using the Fiber-Optics Particle Analyzer FPAR-1000 (manufactured by Otsuka Electronics Co., Ltd.). A dynamic light scattering method is used as a measurement principle, and a cumulant method is used as a size distribution analysis method. A light scattering diameter is used to represent the size of one particle (to set a representative diameter), the cumulant method is used to represent a size distribution of particles in a particle assemblage (to represent a particle size distribution), and the way of selecting an average size representative of the particle assemblage (the way of selecting an average particle size) is defined by a particle size of 50% of a cumulative value when represented by cumulative (accumulative) mass percentage and is done by d50 (D50).

If the average particle size of the particles of the acrylic resin is 0.04 µm or more and 0.07 µm or less, the particles of the acrylic resin are easily adhered and fixed to the object to be written without being permeated into the object to be written with the liquid component, making it possible to suppress diffusion of the carbon black and/or organic pigment in the ink composition.

In addition, if the average particle size of the particles of the acrylic resin is 0.10 µm or less, or 0.09 µm or less, the particles are captured in a fine structure of the object to be written (for example, gaps between fibers if the object to be written is paper), making the particles easily be fixed to the object to be written.

Therefore, it is possible to effectively suppress diffusion of the carbon black and/or organic pigment by setting the average particle size of the particles of the acrylic resin within the above-described range.

It is preferable that the particles of the acrylic resin have a solid acid value of 50 or more and less than 100. Alternatively, if emulsion including the particles of the acrylic resin is used, a solid acid value of the emulsion is preferably 50 or more and less than 100.

If the particles of the acrylic resin have the solid acid value of 50 or more, it is likely that good compatibility between the water and the diols is obtained. In addition, if the particles of the acrylic resin have the solid acid value of less than 100, dispersion of the particles of the acrylic resin in the ink composition is stabled easily, making it possible to suppress diffusion of the black carbon and/or organic pigment over a long period of time.

Specific examples of the particles of the acrylic resin or the emulsion including the particles include Joncryl7100 (solid acid value: 51, solid content: 48%, average particle size: 0.10 µm), Joncry390 (solid acid value: 54, solid content: 46%, average particle size: 0.09 µm), JoncryPDX7326 (solid acid value: 38, solid content: 38.5%, average particle size: 0.10 pun), JoncryPDX7370 (solid acid value: 87, solid content: 42%, average particle size: 0.08 µm), JoncryPDX7341 (solid acid value: 51, solid content: 49%, average particle size: 0.10 µm), JoncryPDX7687 (solid acid value: 100, solid content: 42%, average particle size: 0.06 µm), Joncry8380 (solid acid value: 19, solid content: 41%, average particle size: 0.09 µm), Joncry8300 (solid acid value: 60, solid content: 43.5%, average particle size: 0.09 µm), Joncry74J (solid acid value: 51, solid content: 45%, average particle size: 0.08 µm), Joncry8383 (solid acid value: 23, solid content: 40%, average particle size: 0.09 µm), JoncryPDX7323 (solid acid value: 87, solid content: 42%, average particle size: 0.08 µm), JoncryPDX7677 (solid acid value: 70, solid content: 46%, average particle size: 0.01 µm), Joncry7600 (solid acid value: 60, solid content: 47%, average particle size: 0.09 µm), Joncry775 (solid acid value: 55, solid content: 45%, average particle size: 0.08 µm), Joncry537J (solid acid value: 40, solid content: 46%, average particle size: 0.07 µm), Joncry352J (solid acid value: 51, solid content: 45%, average particle size: 0.10 µm), Joncry352D (solid acid value: 51, solid content: 45%, average particle size: 0.10 µm), JoncryPDX7145 (solid acid value: 32, solid content: 50%, average particle size: 0.16 µm), Joncry538J (solid acid value: 61, solid content: 45%, average particle size: 0.10 µm), Joncry8311 (solid acid value: 26, solid content: 42%, average particle size: 0.09 µm), JoncryPDX7667 (solid acid value: 82, solid content: 45%, average particle size: 0.09 µm), JoncryPDX7700 (solid acid value: 60, solid content: 48%, average particle size: 0.10 µm), Joncry7641 (solid acid value: 60, solid content: 52%, average particle size: 0.10 µm), Joncry780 (solid acid value: 46, solid content: 48%, average particle size: 0.10 µm), Joncry7610 (solid acid value: 50, solid content: 52%, average particle size: 0.13 µm), JoncryPDX7643 (solid acid value: 64, solid content: 51.5%, average particle size: 0.14 µm), Joncry711 (solid acid value: 100, solid content: 42.0%, average particle size: 0.09 µm), JoncryPDX7182 (solid acid value: 125, solid content: 36.5%, average particle size: 0.11 µm), JoncryPDX7690 (solid acid value: 85, solid content: 42.5%, average particle size: 0.10 µm), JoncryPDX7511 (solid acid value: 54, solid content: 45.0%, average particle size: 0.09 µm), JoncryPDX7692 (solid acid value: 147, solid content: 36.5%, average particle size: 0.14 µm), JoncryPDX7611 (solid acid value: 145, solid content: 36.5%, average particle size: 0.14 µm), JoncryPDX7630A (solid acid value: 200, solid content: 32.0%, average particle size: 0.16 µm), Joncry538J (solid acid value: 61, solid content: 45.0%, average particle size: 0.10 µm), JoncryPDX7696 (solid acid value: 122, solid content: 40.0%, average particle size: 0.08 µm), JoncryPDX7164 (solid acid value: 7, solid content: 47.0%, average particle size: 0.17 µm), JoncryPDX7430 (solid acid value: 30, solid content: 38.0%, average particle size: 0.12 µm), JoncryPDX7440 (solid acid value: 1, solid content: 48.5%, average particle size: 0.25 µm), JoncryPDX7480 (solid acid value: 18, solid content: 44.0%, average particle size: 0.10 µm) (all of which are manufactured by BASF Japan Ltd.), and the like. The average particle size of the particles of the acrylic resin or the emulsion including the particles was measured by using the Fiber-Optics Particle Analyzer FPAR-1000 (manufactured by Otsuka Electronics Co., Ltd.). A dynamic light scattering method was used as a measurement principle, and a cumulant method was used as a size distribution analysis method. A light scattering diameter is used to represent the size of one particle (to set a characteristic particle diameter), the cumulant method is used to represent a size distribution of a particle in a particle assemblage (to represent a particle size distribution), and the way of selecting an average size representative of the particle assemblage (the way of selecting an average particle size) is defined by a particle size of 50% of a cumulative value when represented by cumulative (accumulative) mass percentage and is done by d50 (D50).

The ratio by weight of the content of the above-described particles of the acrylic resin to the content of the above-described two or more of diols in the ink composition is preferably 0.005 or more and 0.25 or less, or more preferably 0.0084 or more and 0.21 or less.

If the ratio by weight of the content of the particles of the acrylic resin to the content of the two or more of diols is 0.005 or more and 0.25 or less, or 0.0084 or more and 0.21 or less, movement of the carbon black and/or organic pigment in the object to be written is restricted easily while maintaining the quick-drying property of the liquid component of the ink composition. Furthermore, if the ratio by weight of the content of the particles of the acrylic resin to the content of the two or more of diols is 0.0084 or more and 0.05 or less, agglomeration with the carbon black and/or organic pigment is suppressed, and thus the degradation in quick-drying property owing to so-called ink dripping which is caused by ink lumped and applied onto the paper surface is suppressed. Accordingly, both the quick-drying property and bleed reduction of ink can be achieved more easily.

Water is used as a prime solvent for ink. It is preferable that deionized water or purified water is used.

In the present invention, the prime solvent means a solvent accounting for 50 wt % or more relative to the whole amount of the solvent in the total amount of the ink composition.

A polysaccharide is used for the ink composition in order to, for example, suppress ink leakage from a pen tip because of its high viscosity when left to stand and obtain shear thinning to smoothly discharge ink because of its viscosity decreased by a shear force of a rotating ball at the time of writing. Moreover, the polysaccharide forms a three-dimensional network structure in the ink composition, and thus an ink composition containing the polysaccharide is likely to be dried more uniformly.

Specific examples of the polysaccharide include microbially derived xanthan gum, succinoglycan, and welan gum (manufactured by Sansho Co., Ltd.), Alcasealan, Alcaseagum, and Zetaseagum (manufactured by Hakuto Co., Ltd.), gellan gum, plant-derived guar gum, psyllium seed gum, tamarind seed gum, tragacanth gum, galactomannan, seaweed-derived carrageenan, ghatti gum derived from a plant resin, karaya gum, and the like.

Xanthan gum is a polysaccharide containing glucose, mannose, and glucuronic acid separated and refined from a culture of *Xanthomonas*. Specific examples of xanthan gum include KELZAN, KELZAN S, KELZAN T, KELZAN ST, KELZAN ASX, KELZAN ASXT, KELZAN AR, KELZAN HP, KELZAN G, KELTROL CG, KELTROL CG-T, KELTROL CG-SFT (all of which are manufactured by Sansho Co., Ltd.), Sun Ace, Sun Ace S, Sun Ace C, Sun Ace C-S, Sun Ace B-S, Sun Ace NF, Sun Ace G, Sun Ace E-S, Sun Ace NXG-S, Sun Ace NXG-C, Bis-Top D-3000-DF, Bis-Top D-3000-DF-C (all of which are manufactured by San-Ei Gen F. F. I. Co., Ltd.), and the like.

One of the polysaccharides may be used, or two or more thereof may be mixed and used. The content of the polysaccharides is preferably 0.05 wt % or more and 5.0 wt % or less relative to the total amount of the ink composition. In order to maintain performance as a ballpoint pen, however, the content of the polysaccharides is more preferably 0.1 wt % or more and 2.0 wt % or less relative to the total amount of the ink composition. If the content of the polysaccharides is less than 0.05 wt %, an ink viscosity is very low when left to stand, and thus ink tends to leak. On the other hand, if the content of the polysaccharides exceeds 5.0 wt %, a viscosity increases excessively at the time of writing. Consequently, ink discharge from a pen tip part tends to be worsened, or writing performance tends to be deteriorated.

The black carbon and/or organic pigment used for the ink composition of the present invention is used to provide a coloring effect for a writing line to be visibly observed and form a waterproof writing line.

Specific examples of a carbon black include Mitsubishi Carbon Black #10B, Mitsubishi Carbon Black #20B, Mitsubishi Carbon Black #14, Mitsubishi Carbon Black #25, Mitsubishi Carbon Black #30, Mitsubishi Carbon Black #33, Mitsubishi Carbon Black #40, Mitsubishi Carbon Black #44, Mitsubishi Carbon Black #45, Mitsubishi Carbon Black #45L, Mitsubishi Carbon Black #50, Mitsubishi Carbon Black #55, Mitsubishi Carbon Black #95, Mitsubishi Carbon Black #260, Mitsubishi Carbon Black #900, Mitsubishi Carbon Black #1000, Mitsubishi Carbon Black #2200B, Mitsubishi Carbon Black #2300, Mitsubishi Carbon Black #2350, Mitsubishi Carbon Black #2400B, Mitsubishi Carbon Black #2650, Mitsubishi Carbon Black #2700, Mitsubishi Carbon Black #4000B, Mitsubishi Carbon Black CF9, Mitsubishi Carbon Black MM, Mitsubishi Carbon Black MALI, Mitsubishi Carbon Black MA77, Mitsubishi Carbon Black MA100, Mitsubishi Carbon Black MA220, Mitsubishi Carbon Black MA230, Mitsubishi Carbon Black MA600 and Mitsubishi Carbon Black MCF88 (all of which are manufactured by Mitsubishi Chemical Corporation), MONARCH 120, MONARCH 700, MONARCH 800, MONARCH 880, MONARCH 1000, MONARCH 1100, MONARCH 1300, MONARCH 1400, MOGUL L, REGAL 99R, REGAL 250R, REGAL 300R, REGAL 330R, REGAL 400R, REGAL 500 and REGAL 660R (all of which are manufactured by Cabot Corporation, U.S.A.), PRINTEX A, PRINTEX G, PRINTEX U, PRINTEX V, PRINTEX 55, PRINTEX 140U, PRINTEX 140V, PRINTEX 35, PRINTEX 40, PRINTEX 45, PRINTEX 85, NINEPex 35, Special Black 4, Special Black 4A, Special Black 5, Special Black 6, Special Black 100, Special Black 250, Special Black 350, Special Black 550, Color Black FW1, Color Black FW2, Color Black FW2V, Color Black FW18, Color Black FW200, Color Black S150, Color Black S160, and Color Black S170 (all of which are manufactured by Degussa Japan Co., Ltd.), RAVEN 5000 ULTRA II, RAVEN 2500 ULTRA, RAVEN 1250 and RAVEN 760 ULTRA (all of which are manufactured by Columbian Carbon Japan, Ltd.), C.I. Pigment Black 7, and the like.

As the organic pigment, for example, an azo pigment, a nitroso pigment, a nitro pigment, a basic dye pigment, an acidic dye pigment, a vat dye pigment, a mordant dye pigment, a natural dye pigment, and the like can be used.

Specific examples of the organic pigment include C.I. Pigment Red 170, C.I. Pigment 213, C.I. Pigment Orange 38, C.I. Pigment Blue 15, C.I. Pigment Violet 23, C.I. 50440, Cyanine Black, Permanent Yellow FGL, Permanent Yellow H10G, Permanent Yellow HR, Lithol Fast Scarlet, Brilliant Carmine BS, Fast Scarlet VD, PV Carmine HR, Watching Red, Permanent Red BL, Fast Violet B, dioxazine violet, Acid Green Lake, phthalocyanine green, C.I. 10316, C.I. 11710, C.I. 11660, C.I. 11670, C.I. 11680, C.I. 11730, C.I. 11735, C.I. 11740, C.I. 12710, C.I. 12720, C.I. 21090, C.I. 21095, C.I. 21100, C.I. 20040, C.I. 21220, C.I. 21135, C.I. 19140, C.I. 47005, C.I. 60520, C.I. 68420, C.I. 12055, C.I. 12075, C.I. 12125, C.I. 12305, C.I. 11725, C.I. 21165, C.I. 21110, C.I. 15510, C.I. 59305, C.I. 59105, C.I. 71105, C.I. 12480, C.I. 12071, C.I. 12120, C.I. 12070, C.I. 12085, C.I. 12090, C.I. 12315, C.I. 12310, C.I. 12335, C.I. 12440, C.I. 12460, C.I. 12420, C.I. 12320, C.I. 12330, C.I. 12450, C.I. 12455, C.I. 12490, C.I. 12120, C.I. 15630, C.I. 15585, C.I. 15500, C.I. 18030, C.I. 15800, C.I. 15825, C.I. 15865, C.I. 15850, C.I. 16105, C.I. 12170, C.I. 12350, C.I. 12385, C.I. 14830, C.I. 15880, C.I. 15825, C.I. 15880, C.I. 45380, C.I. 45170, C.I. 45160, C.I. 58000, C.I. 73300, C.I. 73385, C.I. 12370, C.I. 59300, C.I. 42535, C.I. 42750A, C.I. 42770A, C.I. 42090, C.I. 42025, C.I. 44045, C.I. 74160, C.I. 74180, C.I. 69800, C.I. 69825, C.I. 73000, C.I. 10006, C.I. 10020, C.I. 12775, C.I. 42000, and the like.

As the carbon black and/or the organic pigment, a water-dispersed carbon black and/or organic pigment dispersed by using a surfactant is preferably used because of increasing handling and productivity.

Specific examples of a commercially available water-dispersed carbon black and/or organic pigment include Fuji SP Black 8031, Fuji SP Black 8041, Fuji SP Black 8119, Fuji SP Black 8167, Fuji SP Black 8276, Fuji SP Black 8381, Fuji SP Black 8406, Fuji SP Red 5096, Fuji SP Red 5111, Fuji SP Red 5193, Fuji SP Red 5220, Fuji SP Bordeaux 5500, Fuji SP Blue 6062, Fuji SP Blue 6474, Fuji SP Blue 6133, Fuji SP Blue 6134, Fuji SP Blue 6401, Fuji SP Blue 6555, Fuji SP Blue 6474, Fuji SP Green 7051, Fuji SP Yellow 4060, Fuji SP Yellow 4360, Fuji SP Yellow 4178, Fuji SP Violet 9011, Fuji SP Violet 9602, Fuji SP Pink 9524, Fuji SP Pink 9527, Fuji SP Orange 534, Fuji SP Orange 636, Fuji SP Pink 9429, FUji SP Brown 3074, FUJI SP RED 5543, FUJI SP RED 5657, FUJI SP RED 5653, and FUJI SP RED 5544 (all of which are manufactured by Fuji Pigment Co., Ltd.), Emacol Black CN, Emacol Blue FBB, Emacol Blue FB, Emacol Blue KR, Emacol Green LXB, Emacol Violet BL, Emacol Brown 3101, Emacol Carmmine FB, Emacol Red BS, Emacol Orange R, Emacol Yellow FD, Emacol Yellow IRN, Emacol Yellow 3601, Emacol Yellow FGN, Emacol Yellow GN, Emacol Yellow GG, Emacol Yellow FSG, Emacol Yellow F7G, Emacol Yellow 10GN, Emacol Yellow 10G, Sandye Super Black K, Sandye Super Black C, Sandye Super Grey B, Sandye Super Brown SB, Sandye Super Brown FRL, Sandye Super Brown RR, Sandye Super Green L5G, Sandye Super Green GXB, Sandye Super Navy Blue HRL, Sandye Super Navy Blue GLL, Sandye Super Navy Blue HB, Sandye Super Navy Blue FBL-H, Sandye Super Navy Blue FBL-160, Sandye Super Navy Blue FBB, Sandye Super Violet BL H/C, Sandye Super Violet BL, Sandye Super Bordeaux FR, Sandye Super Pink FBL, Sandye Super Pink FSB, Sandye Super Rubine FR, Sandye Super Carmmine FB, Sandye Super Red FFG, Sandye Super Red RR, Sandye Super Red BS, Sandye Super Red 1315, Sandye Super Orange FL, Sandye Super Orange R, Sandye Super Orange BO, Sandye Gold Yellow 5GR, Sandye Gold Yellow R, Sandye Gold Yellow 3R, Sandye Yellow GG, Sandye Yellow F3R, Sandye Yellow IRC, Sandye Yellow FGN, Sandye Yellow GN, Sandye Yellow GRS, Sandye Yellow GSR-130, Sandye Yellow GSN-130, Sandye Yellow GSN, and Sandye Yellow 10GN (all of which are manufactured by Sanyo Color Works, Ltd.), Rio Fast Black Fx 8012, Rio Fast Black Fx 8313, Rio Fast Black Fx 8169, Rio Fast Red Fx 8209, Rio Fast Red Fx 8172, Rio Fast Red S Fx 8315, Rio Fast Red S Fx 8316, Rio Fast Blue Fx 8170, Rio Fast Blue FX 8170, Rio Fast Blue S Fx 8312, Rio Fast Green S Fx 8314 and EM green G (all of which are manufactured by Toyo Ink Co., Ltd.), NKW-2101, NKW-2102, NKW-2103, NKW-2104, NKW-2105, NKW-2106, NKW-2107, NKW-2108, NKW-2117, NKW-2127, NKW-2137, NKW-2167, NKW-2101P, NKW-2102P, NKW-2103P, NKW-2104P, NKW-2105P, NKW-2106P, NKW-2107P, NKW-2108P, NKW-2117P, NKW-2127P, NKW- 2137P, NKW-2167P, NKW-2405E, NKW-2404E, NKW-2407E, NKW-2408E, NKW-2167E, NKW-3002, NKW-3003, NKW-3004, NKW-3005, NKW-3007, NKW-3077, NKW-3008, NKW-3402, NKW-3404, NKW-3405, NKW-3407, NKW-3408, NKW-3477, NKW-3602, NKW-3603, NKW-3604, NKW-3605, NKW-3607, NKW-3677, NKW-3608, NKW-3702, NKW-3703, NKW-3704, NKW-3705, NKW-3777, NKW-3708, NKW-6013, NKW-6038, and NKW-6559 (all of which are manufactured by Nippon Keiko Kagaku Co., Ltd.), Cosmo Color S1000F series (manufactured by Toyo Soda K.K.), Victoria Yellow G-11, Victoria Yellow G-20, Victoria Orange G-16, Victoria Orange G-21, Victoria Red G-19, Victoria Red G-22, Victoria Pink G-17, Victoria Pink G-23, Victoria Green G-18, Victoria Green G-24, Victoria Blue G-15 and Victoria Blue G-25 (all of which are manufactured by Mikuni-Color Co., Ltd.), POLLUX series such as POLLUX PC5T1020, POLLUX Black PC8T135, and POLLUX Red IT1030 (all of which are manufactured by Sumika Color Co., Ltd.), and the like.

One of the water-dispersed carbon black and/or organic pigments dispersed by using the surfactant may be used, or two or more thereof may be mixed and used.

An addition amount of the carbon black and/or organic pigments is preferably 3.0 wt % or more and 15.0 wt % or less relative to the total amount of the ink composition. If the addition amount is less than 3.0 wt %, a writing line density is low, and thus it may become difficult to visibly observe a writing line. If the addition amount is more than 15.0 wt %, writing performance may rather be worsened.

One of the carbon black and/or organic pigments may be used, or two or more thereof may be mixed and used.

In addition to the above-described carbon black and/or organic pigment, as a colorant, for example, an inorganic pigment such as ochre, barium yellow, ultramarine, iron blue, cadmium red, barium sulphate, titanium oxide, red iron oxide, and black iron oxide, a metal powder pigment such as aluminium powder, gold powder, silver powder, copper powder, tin powder, and brass powder, a fluorescent pigment, a mica pigment, and the like may be used.

One of the inorganic pigments, metal powder pigments, fluorescent pigments, mica pigments, and the like may be used, or two or more thereof may be mixed and used.

In addition to the above-described carbon black and/or organic pigment, a dye can be used in combination as a colorant.

As the dye, for example, at least one of acid dyes, direct dyes, basic dyes, and the like can be used.

Specific examples of the dye include the direct dye such as C.I. Direct Black 17, C.I. Direct Black 19, C.I. Direct Black 22, C.I. Direct Black 32, C.I. Direct Black 38, C.I. Direct Black 51, C.I. Direct Black 71, C.I. Direct Yellow 4, C.I. Direct Yellow 26, C.I. Direct Yellow 44, C.I. Direct Yellow 50, C.I. Direct Red 1, C.I. Direct Red 4, C.I. Direct Red 23, C.I. Direct Red 31, C.I. Direct Red 37, C.I. Direct Red 39, CI Direct Red 75, CI Direct Red 80, C.I. Direct Red 81, C.I. Direct Red 83, C.I. Direct Red 225, C.I. Direct Red 226, C.I. Direct Red 227, C.I. Direct Blue 1, C.I. Direct Blue 15, C.I. Direct Blue 71, C.I. Direct Blue 86, C.I. Direct Blue 106, and C.I. Direct Blue 199, the acid dye such as C.I. Acid Black 1, C.I. Acid Black 2, C.I. Acid Black 24, C.I. Acid Black 26, C.I. Acid Black 31, C.I. Acid Black 52, C.I. Acid Black 107, C.I. Acid Black 109, C.I. Acid Black 110, C.I. Acid Black 119, C.I. Acid Black 154, C.I. Acid Yellow 7:1, C.I. Acid Yellow 17, C.I. Acid Yellow 19, C.I. Acid Yellow 23, C.I. Acid Yellow 25, C.I. Acid Yellow 29, C.I. Acid Yellow 38, C.I. Acid Yellow 42, C.I. Acid Yellow 49, C.I. Acid Yellow 61, C.I. Acid Yellow 72, C.I. Acid Yellow 78, C.I. Acid Yellow 110, C.I. Acid Yellow 127, C.I. Acid Yellow 135, C.I. Acid Yellow 141, C.I. Acid Yellow 142, C.I. Acid Red 8, C.I. Acid Red 9, C.I. Acid Red 14, C.I. Acid Red 18, C.I. Acid Red 26, C.I. Acid Red 27, C.I. Acid Red 35, C.I. Acid Red 37, C.I. Acid Red 51, C.I. Acid Red 52, C.I. Acid Red 57, C.I. Acid Red 82, C.I. Acid Red 87, C.I. Acid Red 92, C.I. Acid Red 94, C.I. Acid Red 111, C.I. Acid Red 129, C.I. Acid Red 131, C.I. Acid Red 138, C.I. Acid Red 186, C.I. Acid Red 249, C.I. Acid Red 254, C.I. Acid Red 265, C.I. Acid Red 276, C.I. Acid Violet 15, C.I. Acid Violet 17, C.I. Acid Blue 1, C.I. Acid Blue 1, C.I. Acid Blue 7, C.I. Acid Blue 9, C.I. Acid Blue 15, C.I. Acid Blue 22, C.I. Acid Blue 23, C.I. Acid Blue 25, C.I. Acid Blue 40, C.I. Acid Blue 41, C.I. Acid Blue 43, C.I. Acid Blue 62, C.I. Acid Blue 78, C.I. Acid Blue 83, C.I. Acid Blue 90, C.I. Acid Blue 93, C.I. Acid Blue 103, C.I. Acid Blue 112, C.I. Acid Blue 113, C.I. Acid Blue 158, C.I. Acid Green 3, C.I. Acid Green 9, C.I. Acid Green 16, C.I. Acid Green 25, and C.I. Acid Green 27, and the basic dye such as C.I. Basic Yellow 11, C.I. Basic Yellow 13, C.I. Basic Yellow 15, C.I. Basic Yellow 19, C.I. Basic Yellow 21, C.I. Basic Yellow 28, C.I. Basic Yellow 51, C.I. Basic Orange 21, C.I. Basic Orange 30, C.I. Basic Red 1, C.I. Basic Red 12, C.I. Basic Red 15, C.I. Basic Red 18, C.I. Basic Red 27, C.I. Basic Red 46, C.I. Basic Violet 1, C.I. Basic Violet 3, CI, Basic Violet 10, C.I. Basic Blue 1, C.I. Basic Blue 3, C.I. Basic Blue 9, C.I. Basic Blue 41, C.I. Basic Blue 54, C.I. Basic Green 1, Basic Green 4, and C.I. Basic Brown 1.

One of the dyes may be used, or two or more thereof may be mixed and used.

As sealers, the ink composition may further contain at least one of alumina, silicon carbide, chromium oxide, boron carbide, zircon, tungsten carbide, silica, diamond, aluminum nitride, or silicone nitride.

In this case, when the ink composition is adhered to an object to be written, the particles of the acrylic resin are fixed to the object to be written, and particles of the sealers enter gaps of the object to be written (for example, gaps between paper surface fibers), making it possible to express a sealing effect. Thus, it is possible to restrict movement of the carbon black and/or organic pigment more effectively, and to suppress ink bleed more effectively.

An average particle size of the sealers (such as the above-described alumina) is preferably 0.1 μm or more and 10 μm or less. In this case, the particles of the sealers easily enter the gaps of the object to be written (for example, the gaps between the paper surface fibers), facilitating expression of the sealing effect. The average particle size of alumina is measured by using MT3300 (manufactured by MicrotracBEL Corp.), a light scattering diameter is used to represent the size of one particle (to set a representative diameter), a volume average diameter is used to represent a size distribution of particles in a particle assemblage (to represent a particle size distribution), and the way of selecting an average size representative of the particle assemblage (the way of selecting an average particle size) is defined by a particle size (D50) at the time of 50% of volume accumulation.

Alternatively, the ratio of an average particle size A of the sealers to an average particle size B of the carbon black and/or organic pigments preferably satisfies $A/B \geq 1.0$. In this case, the particles of the sealers enter the gaps of the object to be written (for example, the gaps between the paper surface fibers), further facilitating restriction of movement of the carbon black and organic pigments.

The content of the sealers (such as the above-described alumina) in the ink composition is preferably 0.003 wt % or more and 1.0 wt % or less. If the content of the sealers is 0.003 wt % or more and 1.0 wt % or less, an effect of restricting movement of the carbon black and/or organic pigment is sufficiently obtained.

It is possible to use a typically-known organic solvent in combination in order to provide the ink composition with various functions (for example, ink antifreeze at a low temperature, ink drying prevention at a pen tip, and the like).

Specific examples of the above-described organic solvent include glycerols such as glycerol; glycols such as benzyl glycol and benzyl diglycol; glycol ethers such as ethylene glycol monomethyl ether, propylene glycol monomethyl ether, diethylene glycol monomethyl ether, dipropylene glycol monomethyl ether, ethylene glycol monoethyl ether, propylene glycol monoethyl ether, diethylene glycol monoethyl ether, dipropylene glycol monoethyl ether, ethylene glycol monobutyl ether, ethylene glycol monohexyl ether, ethylene glycol monophenyl ether, diethylene glycol monobutyl ether, diethylene glycol monohexyl ether, diethylene glycol monophenyl ether, propylene glycol monobutyl ether, propylene glycol monophenyl ether, tripropylene glycol monobutyl ether, and tripropylene glycol monophenyl ether; alcohol solvents such as benzyl alcohol, α-methyl-benzyl alcohol, lauryl alcohol, tridecyl alcohol, isododecyl alcohol, and isotridodecyl alcohol; propylene glycol methyl ether acetate, propylene glycol diacetate, 2-pyrrolidone, N-methyl-2-pyrrolidone, and the like.

One of the organic solvents may be used, or two or more thereof may be mixed and used.

The content of the organic solvents is preferably 0.05 wt % or more and 10.0 wt % or less relative to the total amount of the ink composition. Although a reason is unknown, if, particularly, 2-methylpentane-2,4-diol, water, and polyhydric alcohol are used in combination each in an amount of 2.5 wt % or more and 10.0 wt % or less relative to the total amount of the ink composition, the ink composition is dried more quickly and uniformly without any unevenness in order to further uniform the three-dimensional network structure of the polysaccharide.

The ink composition may further include a lubricant to increase lubricity between a ball and a tip main body, and obtain a smooth sense of writing.

As the above-described lubricant, for example, a phosphoric acid derivative can be used.

Specific examples of the phosphoric acid derivative include NIKKOL DLP-10 (the following formula (1), polyoxyethylene lauryl ether phosphate, $R_1:C_{12}$), NIKKOL DOP-8NV (the following formula (1), polyoxyethylene oleyl ether sodium phosphate, $R_1:C_{18}$-unsaturated), NIKKOL DDP-2 (the following formula (1), polyoxyethylene alkyl (12 to 15) ether phosphoric acid, $R_1:C_{12}$ to $C_{15}$), NIKKOL DDP-4 (the following formula (1), polyoxyethylene alkyl (12 to 15) ether phosphoric acid, $R_1:C_{12}$ to $C_{15}$), NIKKOL DDP-6 (the following formula (1), polyoxyethylene alkyl (12 to 15) ether phosphoric acid, $R_1:C_{12}$ to $C_{15}$), NIKKOL DDP-8 (the following formula (1), polyoxyethylene alkyl (12 to 15) ether phosphoric acid (8E. O.), $R_1:C_{12}$ to $C_{15}$), NIKKOL DDP-10 (the following formula (1), polyoxyethylene alkyl (12 to 15) ether phosphoric acid (10E. O.), $R_1:C_{12}$ to $C_{15}$), NIKKOL TLP-4 (the following formula (2), polyoxyethylene lauryl ether sodium phosphate, $R_1$ and/or $R_2:C_{12}$), NIKKOL TCP-5 (the following formula (2), polyoxyethylene cetyl ether sodium phosphate, $R_1$ and/or $R_2:C_{12}$), NIKKOL TOP-0V (the following formula (2), trioleyl phosphate, $R_1$ and/or $R_2:C_{18}$-unsaturated), NIKKOL TDP-2 (the following formula (2), polyoxyethylene alkyl (12 to 15) ether phosphoric acid, $R_1$ and/or $R_2:C_{12}$ to $C_{15}$), NIKKOL TDP-6 (the following formula (2), polyoxyethylene alkyl (12 to 15) ether phosphoric acid, $R_1$ and/or $R_2:C_{12}$ to $C_{15}$), NIKKOL TDP-8 (the following formula (2), polyoxyethylene alkyl (12 to 15) ether phosphoric acid, $R_1$ and/or $R_2:C_{12}$ to $C_{15}$), NIKKOL TDP-10 (the following formula (2), polyoxyethylene alkyl (12 to 15) ether phosphoric acid, $R_1$ and/or $R_2:C_{12}$ to $C_{18}$) (all of which are manufactured by Nikko Chemicals Co. Ltd.), SM-172 (the following formula (1), n=0, $R_1:C_8$-branched), GF-339 (the following formula (1), n=0, $R_1:C_6$ to $C_{10}$), GF-119 (the following formula (1), n=0, $R_1:C_{12}$), GF-185 (the following formula (1), n=0, $R_1:C_{13}$-branched), Phosphanol ML-200 (the following formula (1), n=0, $R_1:C_{12}$), Phosphanol BH-650 (the following formula (1), n=1, $R_1:C_4$), Phosphanol ED-200 (the following formula (1), n=1, $R_1:C_8$-branched), Phosphanol RA-600, (the following formula (1), n=4, $R_1:C_6$ to $C_{10}$), Phosphanol ML-200 (the following formula (1), n=2, $R_1:C_{12}$), Phosphanol ML-240 (the following formula (1), n=4, $R_1:C_{12}$), Phosphanol RD-510Y (the following formula (1), n=4, $R_1:C_{12}$), Phosphanol RS-410 (the following formula (1), n=3, $R_1:C_{13}$-branched), Phosphanol RS-610 (the following formula (1), n=6, $R_1:C_{13}$-branched), Phosphanol RS-710 (the following formula (1), n=10, $R_1:C_{13}$-branched), Phosphanol RL-210 (the following formula (1), n=2, $R_1:C_{18}$), Phosphanol RL-310 (the following formula (1), n=3, $R_1:C_{18}$), Phosphanol RB-410, (the following formula (1), n=4, $R_1:C_{18}$-unsaturated), Phosphanol RP-710, Phosphanol CP-120, Anse Tex AK-25 (the following formula (1), n=0, $R_1:C_4$, sodium salt), Phosphanol 702 (the following formula (1), n=4, $R_1:C_{12}$, sodium salt), Phosphanol SC-6103 (the following formula (1), n=6, $R_1:C_{13}$-branched, calcium salt), Phosphanol RD-715 (the following formula (1), n=7, $R_1:C_{18}$-unsaturated, sodium salt), Phosphanol RD-720 (the following formula (1), n=7, $R_1:C_{18}$-unsaturated, sodium salt), Phosphanol LP-700, Phosphanol LS-500 (the following formula (1), n=3, $R_1:C_{13}$-branched), Phosphanol LB-400 (the following formula (1), n=4, $R_1:C_{18}$-unsaturated) (all of which are manufactured by TOHO Chemical Industry Co., Ltd.), plies surf A212C (the following formula (2), polyoxyethylene tridecyl ether phosphate, $R_1$ and/or $R_2:C_{10}$), plies surf A215C (the following formula (2), polyoxyethylene tridecyl ether phosphate, $R_1$ and/or $R_2:C_{10}$), plies surf A208F (the following formula (1), polyoxyethylene alkyl (C8) ether phosphate, $R_1:C_8$), plies surf M208F (the following formula (1), polyoxyethylene alkyl (C8) ether phosphate ester monoethanolamine salt, $R_1:C_8$), plies surf A208N (the following formula (1), polyoxyethylene alkyl (C12, 13) ether phosphate, $R_1:C_{12}$, $C_{13}$), plies surf A208B (the following formula (1), polyoxyethylene lauryl ether phosphate, $R_1:C_{12}$), plies surf A219B (the following formula (1), polyoxyethylene lauryl ether phosphate, $R_1:C_{12}$), plies surf DB-01 (the following formula (1), polyoxyethylene lauryl ether phosphate monoethanolamine salt, $R_1:C_{12}$), plies surf A210D (the following formula (1), polyoxyethylene alkyl (C10) ether phosphate ester, $R_1:C_{10}$), plies surf AL, plies surf DBS (the following formula (1), alkyl (C4) sodium phosphate ester, $R_1:C_4$), plies surf DOM (the following formula (1), alkyl (C8) ether phosphate ester monoethanolamine salt, $R_1:C_8$) (all of which are manufactured by DKS Co. Ltd.), and the like.

Using a phosphoric acid derivative represented by the following general formula (1) or (2) among the above phosphoric acid derivatives, by an action of a long-chain alkyl group, the particles of the acrylic resin and the two or more of diols are easily taken into a network structure of the polysaccharide, and writing line bleed formed by the ink composition can be suppressed more effectively, which is thus preferred.

[Formula 1]

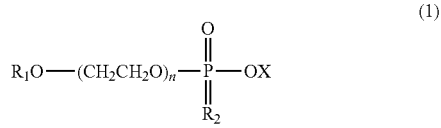

(1)

In the above general formula (1), $R_1$ is an alkyl group or unsaturated alkyl group of $C_{12}$ or more and $C_{18}$ or less, and $R_2$ is OX or $R_1O$—$(CH_2CH_2O)_n$ (n is an integer equal to 0 or 1 or more and 10 or less, and X is an alkali metal, amine, or H).

Formula 2]

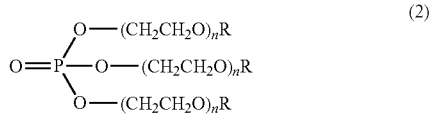

(2)

In the above general formula (2), R is an alkyl group or unsaturated alkyl group of $C_{12}$ or more and $C_{18}$ or less. n is an integer equal to 0 or 1 or more and 10 or less.

Specific examples of the phosphoric acid derivative represented by the above general formula (1) or (2) include GF-199, GF-185, Phosphanol ML-200, Phosphanol ML-220, Phosphanol ML-240, Phosphanol RD-510Y, Phosphanol RS-410, Phosphanol RS-610, Phosphanol RS-710, Phosphanol RL-210, Phosphanol RL-310, Phosphanol RB-410, Phosphanol 702, Phosphanol SC-6103, Phosphanol RD-715, Phosphanol RD-720, Phosphanol LS-500, Phosphanol LB-400 (all of which are manufactured by TOHO Chemical Industry Co., Ltd), NIKKOL DLP-10, NIKKOL DOP-8NK NIKKOL DDP-2, NIKKOL DDP-4, NIKKOL DDP-6, NIKKOL DDP-8, NIKKOL DDP-10, NIKKOL TLP-4, NIKKOL TCP-5, NIKKOL TOP-0V, NIKKOL TDP-2, NIKKOL TDP-6, NIKKOL TDP-8, NIKKOL TDP-10 (all of which are manufactured by Nikko Chemicals Co., Ltd), plies surf A208N, plies surf A208B, plies surf 219B, plies surf DB-01 (all of which are manufactured by DKS Co. Ltd.), and the like.

Although a reason is unknown, if, a hydrophobic group, particularly, Phosphanol RS-710, Phosphanol RB-410, Phosphanol LB-400 (all of which are manufactured by Nikko Chemicals Co., Ltd), or the like uses phosphoric acid derivatives of $C_{13}$ branched or $C_{18}$-unsaturated, the ink composition is dried more quickly, and bleed-through hardly occurs, which is thus more preferred. Among these, it is most preferable that the hydrophobic group uses the phosphoric acid derivatives of $C_{13}$-branched.

As these phosphoric acid derivatives, salt such as sodium salt, potassium salt, lithium salt, or amine salt may be used for ink from the beginning. Alternatively, these phosphoric acid derivatives may be transformed into salt in ink to be used by using the phosphoric acid derivatives in combination when blending ink. Specific examples of alkali for forming salt of the phosphoric acid derivatives include sodium hydroxide, lithium hydroxide, potassium hydroxide, monoethanolamine, diethanolamine, triethanolamine, 2-amino-2-methyl-1, 3-propanediol, and the like.

One of the phosphoric acid derivatives may be used, or two or more thereof may be mixed and used. The content of the phosphoric acid derivatives is preferably, as solid content, 0.3 wt % or more and 5.0 wt % or less relative to the total amount of the ink composition. If the content of the phosphoric acid derivatives is less than 0.3 wt %, a sufficient effect may not be obtained. Even if the content of the phosphoric acid derivatives is added exceeding 5.0 wt %, an effect thereof may not be improved any more.

Furthermore, it is also possible to use various additives as needed. The various additives include wetters such as urea, ethyleneurea, and thiourea, preservatives such as a benzothiazoline system and an omadine system, a rust inhibitor such as benzotriazole, emulsion such as a styrene-acrylic copolymer and alkali salt thereof, and vinyl acetate resin in order to fix a pigment to a surface to be written, pH adjusters such as sodium hydroxide, 2,2-aminomethyl-1, 3-propanediol, triethanolamine, and diethanolamine, a defoaming agent such as silicone emulsion, solid lubricants such as alumina and chromium oxide, and extenders such as aluminum silicate, calcium carbonate, and a resin sphere.

One of the wetters, preservatives, rust inhibitor, emulsion, pH adjusters, defoaming agent, and solid lubricants may be used, or two or more thereof may be mixed and used.

In some embodiments, the ink composition has a viscosity of at least 50 mPa·s and at most 10,000 mPa·s at a temperature of 25° C. and at a shear rate of 0.35 sec$^{-1}$, and the ink composition has a viscosity of at least 50 mPa·s and at most 1,000 mPa·s at a temperature of 25° C. and at a shear rate of 35 sec$^{-1}$.

If the ink composition has the viscosities within the above-described ranges, the carbon black and/or the organic pigment is likely to remain on the surface of the object to be written when the ink composition is adhered to the object to be written, resulting in diols soaking into the object to be written and the particles of the acrylic resin being fixed to the object to be written. Thus, it is possible to suppress ink bleed more effectively.

The ink composition according to some embodiments may be produced according to various methods that have been conventionally known.

In one embodiment, the ink composition may be obtained by dispersing, in water, a carbon black and/or an organic pigment, a polysaccharide, two or more of dials and, an acrylic resin.

For example, the ink composition is obtained by mixing and stirring water, the two or more of diols, and the polysaccharide on an agitator having high shear force such as Henschel mixer, propeller agitator, homogenizer, turbo mixer, and high pressure homogenizer, and then adding a coloring agent dispersed by a disperser such as Henschel mixer, propeller agitator, homogenizer, turbo mixer, high pressure homogenizer, a ball mill, a bead mill, and a roll mill and remaining other components to further mix and stir the coloring agent and the remaining other components.

In the preparation steps, generated dispersion heat may directly be used while stirring, or stirring may be performed while heating or cooling. Bubble, removal by a defoamer, filtration of a coarse material by a filtering device, and the like may be performed as needed. Furthermore, an aging step may be performed after preparing ink in order to obtain sufficient dispersibility of a polysaccharide.

These various steps of mixing, dispersing, filtering, heating, or cooling may be performed alone, or two or more steps may be performed in parallel.

EXAMPLES

The present invention is specifically described hereinafter by way of Examples.

(Production of Ink Composition)

Ink compositions of Examples 1 to 22 and Comparative Examples 1 to 7 having compositions shown in Tables 1 to 4 below were produced.

More specifically, the following were used as materials for the respective compositions shown in Tables 1 to 4.

<Carbon Black>
CB-1: FUJI SP BLACK 8031 (black pigment dispersion, carbon black, manufactured by Fuji Pigment Co., Ltd.)
CB-2: FUJI SP BLACK 8041 (black pigment dispersion, carbon black, manufactured by Fuji Pigment Co., Ltd.)
CB-3: carbon black #10 (carbon black, manufactured by Mitsubishi Chemical Corporation)

<Organic Pigment>
OP-1: FUJI SP RED 5543 (red pigment dispersion, organic pigment, manufactured by Fuji Pigment Co., Ltd.)
OP-2: FUJI SP RED 5657 (red pigment dispersion, organic pigment, manufactured by Fuji Pigment Co., Ltd.)
OP-3: FUJI SP RED 5653 (red pigment dispersion, organic pigment, manufactured by Fuji Pigment Co., Ltd.)
OP-4: FUJI SP BLUE 6062 (blue pigment dispersion, organic pigment, manufactured by Fuji Pigment Co., Ltd.)
OP-5: FUJI SP BLUE 6474 (blue pigment dispersion, organic pigment, manufactured by Fuji Pigment Co., Ltd.)
OP-6: FUJI SP VIOLET 9011 (violet pigment dispersion, organic pigment, manufactured by Fuji Pigment Co., Ltd.)
OP-7: FUJI SP VIOLET 9602 (violet pigment dispersion, organic pigment, manufactured by Fuji Pigment Co., Ltd.)

<Solvent>
deionized water

<Polysaccharide>
PS-1: 6 wt % of aqueous solution of KELZAN AR (polysaccharide, xanthan gum dispersion liquid manufactured by Sansho Co., Ltd.)
PS-2: xanthan gum <Diol>
DI-1: 2-methylpentane-2,4-diol (alkanediol having 6 carbon atoms)
DI-2: 3-methyl-1,3-butanediol (alkanediol having 5 carbon atoms)
DI-3: 1,2-hexanediol (alkanediol having 6 carbon atoms)
DI-4: 1,7-heptanediol (alkanediol having 7 carbon atoms)
DII-1: ethylene glycol (alkanediol having 2 carbon atoms)
DII-2: propylene glycol (alkanediol having 3 carbon atoms)
DII-3: 1,3-butanediol (alkanediol having 4 carbon atoms)
DII-4: diethylene glycol (alkanediol having 4 carbon atoms)

<Acrylic Resin>
AC-1: Joncryl-PDX7677 (particles of an acrylic resin, average particle size: 0.01 μm, manufactured by BASF Japan Ltd.)
AC-2: SU-100 (urethane acrylic particles (emulsion), average particle size: 0.084 μm, manufactured by CSC CO., LTD.)
AC-3: Joncryl-PDX7182 (particles (emulsion) of styrene-acrylic copolymers, average particle size: 0.01 μm, acid value: 125, manufactured by BASF Japan Ltd.)
AC-4: Joncryl-PDX7323 (particles (emulsion) of styrene-acrylic copolymers, average particle size: 0.08 μm, acid value: 87, manufactured by BASF Japan Ltd.)
AC-5: acrylate copolymer sodium <Alumina (Sealer)>
AO-1: AKP20 0.67 wt % of glycerin dispersion (alumina, average particle size: 0.46 μm, manufactured by Sumitomo Chemical Co., Ltd.)
AO-2: alumina #8000 (alumina, average particle size: 1.2 μm±0.3 μm, manufactured by Sumitomo Chemical Co., Ltd.)

<Organic Solvent>
OS-1: glycerin
OS-2: 3-methyl-3-methoxy-1-butanol

<Lubricant>
LU-1: Phosphanol RB-410 (polyoxyethylene alkyl ether phosphoric acid, manufactured by TOHO Chemical Industry Co., Ltd.) 20 wt % of aqueous solution
LU-2: Phosphanol RS-710 (polyoxyethylene alkyl ether phosphoric acid, manufactured by TOHO Chemical Industry Co., Ltd.) 20 wt % of aqueous solution
LU-3: Phosphanol ML-240 (polyoxyethylene alkyl ether phosphoric acid, manufactured by TOHO Chemical Industry Co., Ltd.) 20 wt % of aqueous solution <Rust Inhibitor>
AR-1: benzotriazole 20 wt % of ethylene glycol solution
AR-2: benzotriazole <Aifungal Agent>
AF-1: Proxel GXL (aifungal agent, manufactured by Lonza Japan Ltd.)
AF-2: benzoate soda <Resin>
PVA224E (polyvinyl alcohol, manufactured by KURARAY CO., LTD.)

<pH Adjuster>
NaOH

However, a pH adjuster was added such that pH of each ink composition was 8.0 or more and 8.8 or less.

The ink compositions of respective Examples and Comparative Examples were formed as follows.

Examples 1 to 22 and Comparative Examples 1 to 7

The whole amount of 6 wt % of an aqueous solution of KELZAN AR 6 as a polysaccharide, the whole amount of deionized water as a solvent, and a whole amount as an organic solvent were mixed and stirred for 1 hour by a homomixer to prepare a xanthan gum aqueous solution. Then, the second dial was added, the first dial was further added, then the carbon black and/or the organic pigment was added, and finally the rest of the components were then added thereto, and the mixture was stirred on the homomixer for 1 hour, thereby obtaining the ink composition.

(Measurement of Material Value)

Material values of the ink compositions of Examples 1 to 22 and Comparative Examples 1 to 7 obtained as described above were measured. The measured material values and measurement methods are as follows. In addition, Tables 1 to 4 below show measurement results of the respective material values.

<pH> pH of the ink compositions of respective Examples and Comparative Examples were measured. The above pH measurement was performed with a "LAQUAtwin" Model: AS712 manufactured by HORIBA at a temperature of 25° C.

<Viscosity>

In each of Examples and Comparative Examples, a viscosity at the temperature of 25° C. and a shear rate of 0.35 sec$^{-1}$ (represented as viscosity@0.35 in each Table) and a viscosity at the temperature of 25° C. and a shear rate of 35 sec$^{-1}$ (represented as viscosity@35 in each Table) were measured. [mPa·s] is used as a unit of the measurement results shown in Tables. The above viscosity measurement was performed with a "VAR-100" manufactured by Reologica Instruments. The shear rates and viscosities were measured on a measurement condition with the temperature of 25° C. and a cone plate (1°) of 40 mm.

TABLE 1

|  |  | Example 1 | Example 2 | Example 3 | Example 4 | Example 5 | Example 6 | Example 7 | Example 8 |
|---|---|---|---|---|---|---|---|---|---|
| Carbon black | CB-1 | 25.00 |  |  |  |  |  |  |  |
|  | CB-2 |  |  |  |  | 25.00 | 25.00 | 25.00 | 25.00 |
|  | CB-3 |  |  |  |  |  |  |  |  |
| Organic pigment | OP-1 |  | 12.50 |  |  |  |  |  |  |
|  | OP-2 |  | 12.50 |  |  |  |  |  |  |
|  | OP-3 |  |  |  |  |  |  |  |  |
|  | OP-4 |  |  | 18.00 | 18.00 |  |  |  |  |
|  | OP-5 |  |  |  |  |  |  |  |  |
|  | OP-6 |  |  | 2.00 | 2.00 |  |  |  |  |
|  | OP-7 |  |  |  |  |  |  |  |  |
| Solvent |  | 29.95 | 43.85 | 39.90 | 39.90 | 37.95 | 27.95 | 27.95 | 38.95 |
| First diol | DI-1 | 10.00 |  |  |  |  | 28.00 | 25.00 | 15.00 |
|  | DI-2 | 10.00 |  |  |  | 15.00 |  |  |  |
|  | DI-3 |  | 5.00 |  | 20.00 |  |  |  |  |
|  | DI-4 |  |  | 20.00 |  |  |  |  |  |
| Second diol | DII-1 |  | 10.00 |  |  | 5.00 | 2.00 | 5.00 | 4.00 |
|  | DII-2 | 4.00 |  |  | 4.00 |  |  |  |  |
|  | DII-3 |  |  | 4.00 |  |  |  |  |  |
|  | DII-4 |  |  |  |  |  |  |  |  |
| Organic solvent | OS-1 |  | 1.00 | 1.00 | 1.00 |  |  |  |  |
|  | OS-2 |  |  |  |  |  |  |  |  |
| Lubricant | LU-1 | 5.00 |  |  |  |  |  |  |  |
|  | LU-2 |  |  | 5.00 | 5.00 | 5.00 | 5.00 | 5.00 | 5.00 |
|  | LU-3 |  | 5.00 |  |  |  |  |  |  |
| Rust inhibitor | AR-1 | 2.00 | 4.00 | 2.00 | 2.00 | 2.00 | 2.00 | 2.00 | 2.00 |
|  | AR-2 |  |  |  |  |  |  |  |  |
| Alumina | AO-1 | 1.00 |  | 1.00 | 1.00 | 1.00 | 1.00 | 1.00 | 1.00 |
|  | AO-2 |  | 0.10 |  |  |  |  |  |  |
| Aifungal agent | AF-1 | 0.05 | 0.05 | 0.10 | 0.10 | 0.05 | 0.05 | 0.05 | 0.05 |
|  | AF-2 |  |  |  |  |  |  |  |  |
| Acrylic resin | AC-1 |  |  |  |  |  |  |  | 1.00 |
|  | AC-2 |  |  |  |  |  |  |  |  |
|  | AC-3 |  |  |  |  |  |  |  |  |
|  | AC-4 | 1.00 | 1.00 | 1.00 | 1.00 | 1.00 | 1.00 | 1.00 |  |
|  | AC-5 |  |  |  |  |  |  |  |  |
| Resin olysaccharide | PS-1 | 12.00 | 5.00 | 6.00 | 6.00 | 8.00 | 8.00 | 8.00 | 8.00 |
|  | PS-2 |  |  |  |  |  |  |  |  |
| pH adjuster |  | Proper amount | Proper amount | Proper amount | Proper amount | Proper amount | Proper amount | Proper amount | Proper amount |
| (Total) |  | 100.00 | 100.00 | 100.00 | 100.00 | 100.00 | 100.00 | 100.00 | 100.00 |
| Ink physical property | pH | 8.3 | 8.6 | 8.3 | 8.0 | 8.3 | 8.3 | 8.3 | 8.3 |
|  | Viscosity @0.35 | 11,000 | 6,000 | 7,500 | 7,000 | 5,500 | 6,700 | 6,200 | 5,500 |
|  | Viscosity @3.5 | 300 | 170 | 250 | 250 | 170 | 250 | 220 | 170 |
| Test result | Bleeding | 0 | 5 | 6 | 6 | 4 | 4 | 3 | 2 |
|  | Bleed-through | 7 μm | 13 μm | 13 μm | 13 μm | 11 μm | 11 μm | 10 μm | 9 μm |
|  | Drying property | 4 sec. | 10 sec. | 10 sec. | 10 sec. | 7 sec. | 9 sec. | 8 sec. | 4 sec. |
|  | Temporal stability | ○ | ○ | ○ | ○ | ○ | ○ | ○ | ○ |

TABLE 2

|  |  | Example 9 | Example 10 | Example 11 | Example 12 | Example 13 | Example 14 | Example 15 |
|---|---|---|---|---|---|---|---|---|
| Carbon black | CB-1 |  |  |  |  |  |  |  |
|  | CB-2 | 25.00 | 25.00 | 25.00 | 25.00 | 25.00 | 25.00 | 25.00 |
|  | CB-3 |  |  |  |  |  |  |  |
| Organic pigment | OP-1 |  |  |  |  |  |  |  |
|  | OP-2 |  |  |  |  |  |  |  |
|  | OP-3 |  |  |  |  |  |  |  |
|  | OP-4 |  |  |  |  |  |  |  |
|  | OP-5 |  |  |  |  |  |  |  |
|  | OP-6 |  |  |  |  |  |  |  |
|  | OP-7 |  |  |  |  |  |  |  |

TABLE 2-continued

|  |  | Example 9 | Example 10 | Example 11 | Example 12 | Example 13 | Example 14 | Example 15 |
|---|---|---|---|---|---|---|---|---|
| Solvent |  | 38.95 | 38.95 | 39.65 | 39.95 | 38.95 | 37.95 | 37.95 |
| First diol | DI-1 | 15.00 | 15.00 | 15.00 | 15.00 | 15.00 |  | 15.00 |
|  | DI-2 |  |  |  |  |  | 15.00 |  |
|  | DI-3 |  |  |  |  |  |  |  |
|  | DI-4 |  |  |  |  |  |  |  |
| Second diol | DII-1 | 4.00 | 4.00 | 4.00 | 4.00 | 4.00 | 5.00 | 5.00 |
|  | DII-2 |  |  |  |  |  |  |  |
|  | DII-3 |  |  |  |  |  |  |  |
|  | DII-4 |  |  |  |  |  |  |  |
| Organic solvent | OS-1 |  |  |  |  |  |  |  |
|  | OS-2 |  |  |  |  |  |  |  |
| Lubricant | LU-1 |  |  |  |  |  | 5.00 |  |
|  | LU-2 | 5.00 | 5.00 | 5.00 | 5.00 | 5.00 |  | 5.00 |
|  | LU-3 |  |  |  |  |  |  |  |
| Rust inhibitor | AR-1 | 2.00 | 2.00 | 2.00 | 2.00 | 2.00 | 2.00 | 2.00 |
|  | AR-2 |  |  |  |  |  |  |  |
| Alumina | AO-1 | 1.00 | 1.00 | 1.00 |  | 1.00 | 1.00 | 1.00 |
|  | AO-2 |  |  |  |  |  |  |  |
| Aifungal agent | AF-1 | 0.05 | 0.05 | 0.05 | 0.05 | 0.05 | 0.05 | 0.05 |
|  | AF-2 |  |  |  |  |  |  |  |
| Acrylic resin | AC-1 |  |  |  |  |  |  |  |
|  | AC-2 | 1.00 |  |  |  |  |  |  |
|  | AC-3 |  | 1.00 |  |  |  |  |  |
|  | AC-4 |  |  | 0.30 | 1.00 | 1.00 | 1.00 | 1.00 |
|  | AC-5 |  |  |  |  |  |  |  |
| Resin |  |  |  |  |  |  |  |  |
| Polysaccharide | PS-1 | 8.00 | 8.00 | 8.00 | 8.00 | 8.00 | 8.00 | 8.00 |
|  | PS-2 |  |  |  |  |  |  |  |
| pH adjuster |  | Proper amount | Proper amount | Proper amount | Proper amount | Proper amount | Proper amount | Proper amount |
| (Total) |  | 100.00 | 100.00 | 100.00 | 100.00 | 100.00 | 100.00 | 100.00 |
| Ink physical property | pH | 8.3 | 8.3 | 8.3 | 8.3 | 8.3 | 8.3 | 8.3 |
|  | Viscosity @0.35 | 5,500 | 5,500 | 5,000 | 5,500 | 5,500 | 5,500 | 5,500 |
|  | Viscosity @3.5 | 170 | 170 | 150 | 170 | 170 | 170 | 170 |
| Test result | Bleeding | 2 | 2 | 1 | 1 | 4 | 5 | 0 |
|  | Bleed-through | 9 μm | 9 μm | 8 μm | 8 μm | 11 μm | 13 μm | 7 μm |
|  | Drying property | 4 sec. | 4 sec. | 3 sec. | 3 sec. | 9 sec. | 7 sec. | 2 sec. |
|  | Temporal stability | ○ | ○ | ○ | ○ | ○ | ○ | ○ |

TABLE 3

|  |  | Example 16 | Example 17 | Example 18 | Example 19 | Example 20 | Example 21 | Example 22 |
|---|---|---|---|---|---|---|---|---|
| Carbon black | CB-1 |  |  |  |  |  |  |  |
|  | CB-2 | 25.00 | 25.00 |  |  | 25.00 |  |  |
|  | CB-3 |  |  |  |  |  |  |  |
| Organic pigment | OP-1 |  |  |  |  |  |  |  |
|  | OP-2 |  |  | 12.50 |  |  | 12.50 |  |
|  | OP-3 |  |  | 12.50 |  |  | 12.50 |  |
|  | OP-4 |  |  |  |  |  |  |  |
|  | OP-5 |  |  |  | 18.00 |  |  | 18.00 |
|  | OP-6 |  |  |  |  |  |  |  |
|  | OP-7 |  |  |  | 2.00 |  |  | 2.00 |
| Solvent |  | 37.95 | 37.95 | 46.85 | 39.90 | 38.95 | 47.85 | 40.90 |
| First diol | DI-1 |  |  |  |  | 15.00 | 10.00 | 20.00 |
|  | DI-2 | 15.00 |  |  |  |  |  |  |
|  | DI-3 |  | 15.00 | 10.00 | 20.00 |  |  |  |
|  | DI-4 |  |  |  |  |  |  |  |
| Second diol | DII-1 | 5.00 | 5.00 | 5.00 | 5.00 | 4.00 | 4.00 | 4.00 |
|  | DII-2 |  |  |  |  |  |  |  |
|  | DII-3 |  |  |  |  |  |  |  |
|  | DII-4 |  |  |  |  |  |  |  |
| Organic solvent | OS-1 |  |  |  |  |  |  |  |
|  | OS-2 |  |  |  |  |  |  |  |
| Lubricant | LU-1 |  |  |  |  |  |  |  |
|  | LU-2 |  | 5.00 | 5.00 | 5.00 | 5.00 | 5.00 | 5.00 |
|  | LU-3 | 5.00 |  |  |  |  |  |  |

TABLE 3-continued

|  |  | Example 16 | Example 17 | Example 18 | Example 19 | Example 20 | Example 21 | Example 22 |
|---|---|---|---|---|---|---|---|---|
| Rust inhibitor | AR-1 | 2.00 | 2.00 | 2.00 | 2.00 | 2.00 | 2.00 | 2.00 |
|  | AR-2 |  |  |  |  |  |  |  |
| Alumina | AO-1 | 1.00 | 1.00 |  | 1.00 | 1.00 |  | 1.00 |
|  | AO-2 |  |  | 0.10 |  |  | 0.10 |  |
| Aifungal agent | AF-1 | 0.05 | 0.05 | 0.05 | 0.10 | 0.05 | 0.05 | 0.10 |
|  | AF-2 |  |  |  |  |  |  |  |
| Acrylic resin | AC-1 |  |  |  |  |  |  |  |
|  | AC-2 |  |  |  |  |  |  |  |
|  | AC-3 |  |  |  |  |  |  |  |
|  | AC-4 | 1.00 | 1.00 | 1.00 | 1.00 | 1.00 | 1.00 | 1.00 |
|  | AC-5 |  |  |  |  |  |  |  |
| Resin Polysaccharide | PS-1 | 8.00 | 8.00 | 5.00 | 6.00 | 8.00 | 5.00 | 6.00 |
|  | PS-2 |  |  |  |  |  |  |  |
| pH adjuster |  | Proper amount | Proper amount | Proper amount | Proper amount | Proper amount | Proper amount | Proper amount |
| (Total) |  | 100.00 | 100.00 | 100.00 | 100.00 | 100.00 | 100.00 | 100.00 |
| Ink physical property | pH | 8.3 | 8.3 | 8.8 | 8.3 | 8.3 | 8.3 | 8.3 |
|  | Viscosity @0.35 | 5,500 | 5,500 | 5,000 | 6,800 | 5,600 | 5,100 | 6,850 |
|  | Viscosity @3.5 | 170 | 170 | 140 | 195 | 175 | 145 | 200 |
| Test result | Bleeding | 5 | 5 | 5 | 5 | 0 | 0 | 0 |
|  | Bleed-through | 13 μm | 13 μm | 13 μm | 13 μm | 7 μm | 7 μm | 7 μm |
|  | Drying property | 7 sec. | 10 sec. | 10 sec. | 10 sec. | 2 sec. | 2 sec. | 2 sec. |
|  | Temporal stability | ○ | ○ | ○ | ○ | ○ | ○ | ○ |

TABLE 4

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Carbon black | CB-1 |  |  |  |  |  |  |  |
|  | CB-2 | 25.00 | 25.00 | 25.00 | 25.00 | 25.00 |  | 25.00 |
|  | CB-3 |  |  |  |  |  | 4.00 |  |
| Organic pigment | OP-1 |  | 12.50 |  |  |  |  |  |
|  | OP-2 |  | 12.50 |  |  |  |  |  |
|  | OP-3 |  |  |  |  |  |  |  |
|  | OP-4 |  |  | 18.00 | 18.00 |  |  |  |
|  | OP-5 |  |  |  |  |  |  |  |
|  | OP-6 |  |  | 2.00 | 2.00 |  |  |  |
|  | OP-7 |  |  |  |  |  |  |  |
| Solvent |  | 54.45 | 38.95 | 41.45 | 36.45 | 36.45 | 77.30 | 42.95 |
| First diol | DI-1 |  |  |  |  |  |  |  |
|  | DI-2 |  | 15.00 |  |  |  |  |  |
|  | DI-3 |  |  |  |  |  |  |  |
|  | DI-4 |  |  |  |  |  |  | 15.00 |
| Second diol | DII-1 | 5.00 | 5.00 |  |  | 5.00 | 5.00 |  |
|  | DII-2 |  |  |  |  |  | 10.00 |  |
|  | DII-3 |  |  |  |  |  |  |  |
|  | DII-4 |  |  |  | 5.00 |  |  |  |
| Organic solvent | OS-1 |  |  |  |  |  |  |  |
|  | OS-2 |  |  | 20.00 | 15.00 | 15.00 |  |  |
| Lubricant | LU-1 |  |  | 2.00 | 2.00 | 2.00 |  | 2.00 |
|  | LU-2 |  |  |  | 5.00 | 5.00 |  | 5.00 |
|  | LU-3 | 5.00 | 5.00 |  |  |  |  |  |
| Rust inhibitor | AR-1 | 1.00 | 1.00 | 2.00 | 2.00 | 2.00 |  |  |
|  | AR-2 |  |  |  |  |  | 0.50 | 0.50 |
| Alumina | AO-1 | 1.00 | 1.00 | 1.00 | 1.00 | 1.00 |  | 1.00 |
|  | AO-2 |  |  |  |  |  |  |  |
| Aifungal agent | AF-1 | 0.05 | 0.05 | 0.05 | 0.05 | 0.05 |  | 0.05 |
|  | AF-2 |  |  |  |  |  | 1.00 |  |
| Acrylic resin | AC-1 |  |  |  |  |  |  |  |
|  | AC-2 |  |  |  |  |  |  |  |
|  | AC-3 |  |  |  |  |  |  |  |
|  | AC-4 | 0.50 | 1.00 | 1.00 | 1.00 | 1.00 |  | 1.00 |
|  | AC-5 |  |  |  |  |  | 2.00 |  |
| Resin |  |  | 8.00 |  |  |  |  |  |
| Polysaccharide | PS-1 | 8.00 |  | 7.50 | 7.50 | 7.50 |  | 7.50 |
|  | PS-2 |  |  |  |  |  | 0.20 |  |

TABLE 4-continued

|  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| pH adjuster |  | Proper amount | Proper amount | Proper amount | Proper amount | Proper amount | Proper amount | Proper amount |
| (Total) |  | 100.00 | 100.00 | 100.00 | 100.00 | 100.00 | 100.00 | 100.00 |
| Ink physical property | pH | 8.3 | 8.3 | 8.3 | 8.3 | 8.3 | 8.0 | 8.3 |
|  | Viscosity @0.35 | 6,000 | 5,500 | 8,000 | 8,000 | 8,000 | 8,000 | 8,000 |
|  | Viscosity @3.5 | 170 | 150 | 200 | 200 | 350 | 350 | 350 |
| Test result | Bleeding | 10 | 10 | 10 | 10 | 10 | 10 | 10 |
|  | Bleed-through | 45 μm | 25 μm | 25 μm | 27 μm | 27 μm | 25 μm | 27 μm |
|  | Drying property | 33 sec. | 45 sec. | 25 sec. | 23 sec. | 24 sec. | 23 sec. | 20 sec. |
|  | Temporal stability | ○ | ○ | ○ | ○ | ○ | ○ | x |

(Test Ballpoint Pen Tip)

In order to evaluate ink compositions according to Examples and Comparative Examples, three types of test ballpoint pen tips were prepared. The actual measured dimensions of the test ballpoint pen tips are indicated in Table 5, corresponding positions for dimensions are indicated in FIG. 4 and FIG. 5 which is an arrow view of a section along line II-II' in FIG. 4.

The test ballpoint pen tip has, after flattening the surface of the inward projection 14 (see FIG. 3), a tapered pin (not shown) driven into the inward projection 14 in order to allow smooth rotation of a ball (first and second ballpoint pen tips) or a ball receiving seat 17 having almost the same curvature as the ball 2 formed by pressing the ball 2 against the inward projection 14.

Figure 4:
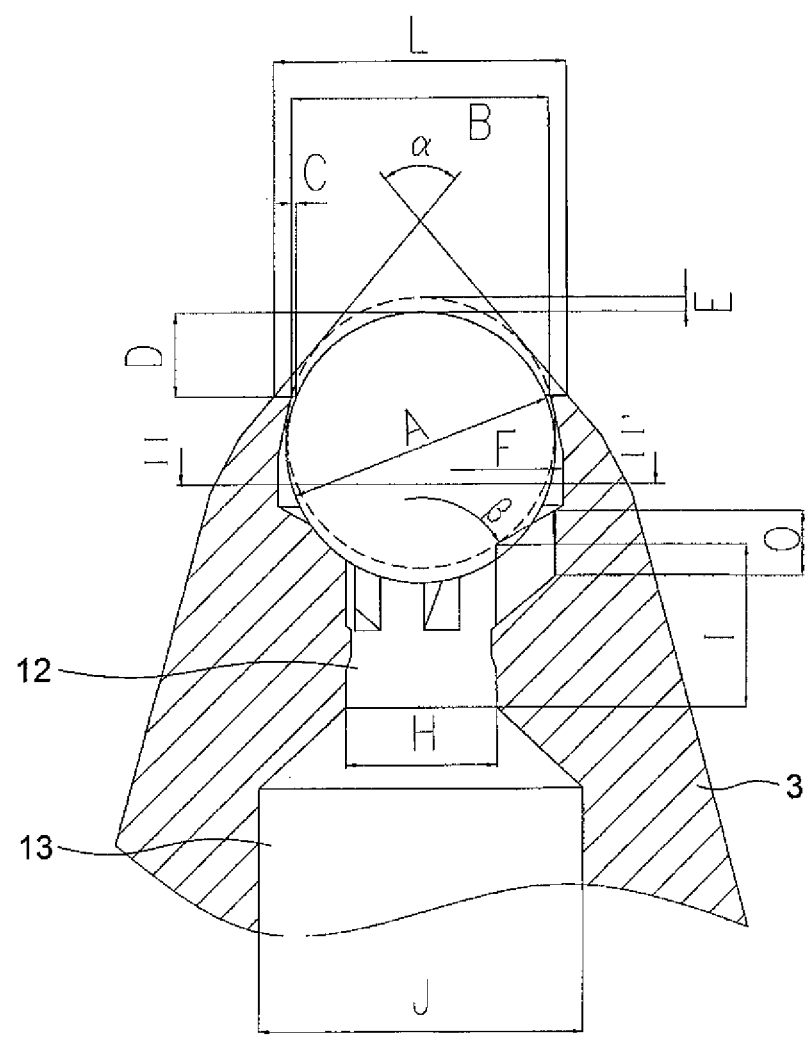
FIG. 4 is a vertical sectional view of a test ballpoint pen tip.

In FIG. 4, the dotted line represents the ball 2 in a state where the ball 2 abuts on the tip end opening 15, and a difference between the solid line and the dotted line represents a displacement E in the back and forth direction of the ball 2. The ball 2 and the coil spring 9 are not illustrated.

Figure 5:
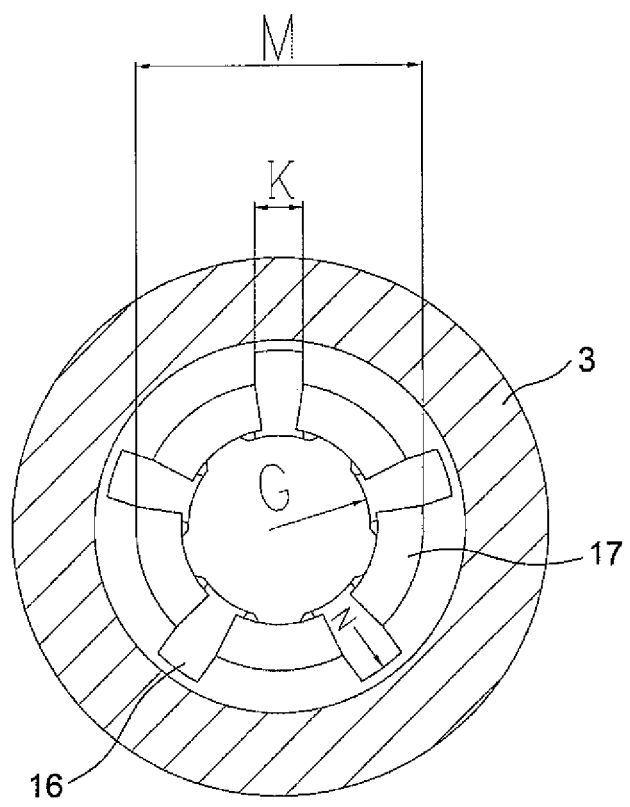
FIG. 5 is an arrow view of a section along line II-II' in FIG. 4.

FIG. 5 illustrates the size of the tip end opening 15 through which ink is discharged from the ballpoint pen tip when the ball 2 rests on the ball seat 17. A cleaner diameter G and a radial groove diameter N each mean a curvature radius of an arrow portion (a radius of a virtual inscribed circle of the arrow portion).

Table 5 shows the dimensions of respective portions of the first to third test ballpoint pen tips.

TABLE 5

| Dimensions | First ballpoint pen tip | Second ballpoint pen tip | Third ballpoint pen tip |
|---|---|---|---|
| Ball diameter A [mm] | 0.5 | 0.5 | 0.7 |
| Distal opening diameter B [mm] | 0.581 | 0.579 | 0.676 |
| Distal opening gap width C [mm] | 0.008 | 0.011 | 0.011 |
| Ball projection length D [mm] | 0.154 | 0.146 | 0.255 |
| Back and forth direction ball displacement E [mm] | 0.027 | 0.033 | 0.038 |
| Ball house part diameter F [mm] | 0.531 | 0.535 | 0.735 |
| Middle hole diameter H [mm] | 0.28 | 0.28 | 0.35 |
| Cleaner diameter G [mm] | 0.25 | 0.25 | 0.32 |
| Middle hole length I [mm] | 0.27 | 0.27 | 0.36 |
| Rear hole diameter J [mm] | 0.62 | 0.61 | 0.60 |
| Radial groove width K [mm] | 0.07 | 0.07 | 0.10 |
| Radial groove diameter N [mm] | 0.502 | 0.509 | 0.695 |
| Radial groove depth O [mm] | 0.15 | 0.14 | 0.17 |
| Distal portion outer diameter L [mm] | 0.622 | 0.623 | 0.696 |
| Spherical receiving seat outer diameter M [mm] | 0.409 | 0.425 | 0.57 |
| Number of radial grooves [—] | 5 | 5 | 5 |
| Caulking angle α [degree] | 80 | 80 | 90 |
| Ball receiving seat opening angle β [degree] | 120 | 120 | 120 |

The material of the ball 2 used in all the test ballpoint pen tips was sintered ceramic mainly composed of WC (manufactured by Tsubaki Nakashima Co., Ltd.). The arithmetic mean height Ra (JIS B 0601) of the ball 2 was 3.0 nm. The material of the ball holder 3 was stainless steel (product name: SF20T, Vickers hardness (HV): 240, manufactured by Shimomura Tokushu Seiko Co., Ltd.).

A coil spring is disposed behind the ball 2 so that the ball 2 is pressed to an inner edge of the tip end opening of the ball holder 3. An ink passing hole is thereby sealed when not in use, preventing ink from oozing out of the ballpoint pen tip and preventing the ink from moving when impact is applied upon dropping or when the pen is left with the tip positioned upward. A material of the spring is SUS304 stainless steel wire. The load of pressing the ball 2 is 0.3 N. If the back and forth direction ball displacement E is set in a range of 4.0% or more and 8.0% or less of a ball diameter A, an appropriate ink discharge amount is obtained, the quick-drying property of a writing line is good, and no bleed occurs. If the back and forth direction ball displacement E is less than 4.0% of the ball diameter A, the ink discharge amount is small, and thus a failure may occur that it is impossible to finish writing completely in a spiral machine written test (writing speed: 7 cm/sec, writing angle: 70°, writing load: 100 gf) owing to poor ink discharge caused by ink clogging inside the tip. If the back and forth direction ball displacement E is more than 8.0%, ink may be lumped, and a writing line may become uneven, resulting in a failure that the drying property of the writing line is worsened.

The tip holder 5 was made of a polybutylene terephthalate resin. The minimum inner diameter of the through hole 4 extending from a back portion of the ballpoint pen tip 1 to the ink storage tube 6 was 0.75 mm.

As the ink storage tube 6, a pipe formed by extrusion of a polypropylene resin was used. The inner diameter of the pipe was 4.65 mm, and the thickness of the pipe was 0.75 mm. Then, 1.0 g of ink and 0.1 g of an ink backward-flow prevention composition were charged thereinto.

The ink backward-flow prevention composition was prepared as follows. 50.0 wt % of Mobil SHF1003 (α-olefin oligomer, base material, manufactured by Mobil Oil Corp.), 45.3 wt % of LUCANT HC-100 (ethylene-α-olefin oligomer, base material, manufactured by Mitsui Chemicals Co., Ltd.), 3.5 wt % of Aerosil R972 (particulate silica, gelling agent, manufactured by Nippon Aerosil Co., Ltd.), and 1.2 wt % of Rheopearl KL (dextrin fatty acid ester, manufactured by Chiba Flour Milling Co., Ltd.) were mixed and stirred for 2 hours at 150° C. with a hot stirrer to obtain a backward-flow prevention composition 1. The viscosity at 25° C. of this backward-flow preventing agent was 30,000 mPa·S.

A bleeding property verification test, a test for bleed-through of a writing line to paper, and a writing line drying property test to be described below were conducted by using the ink compositions and the first to third ballpoint pen tips of Examples 1 to 22 and Comparative Examples 1 to 7 described above.

In each test, the second ballpoint pen tip was used in Examples 1 and 2, 10 to 12, and 15 to 17, the third ballpoint pen tip was used in Examples 3 to 5, 13 and 14, and 18 to 22. The first ballpoint pen tip was used in Examples 6 to 9 and Comparative Examples 1 to 7.

(Bleeding Property Verification Test)

Figure 6:
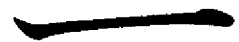
FIG. 6 is a view illustrating a character used for a characteristic test for ink compositions according to Examples.

Under an environment with a room temperature of 25° C. and humidity of 65%, a character of a Chinese numeral "—" illustrated in FIG. 6 was written in a square of a size of 2 cm×2 cm on test paper described in 7.3 of ES S6061, and after the writing line is dried, five writing line widths were randomly measured to calculate an average value of the writing line widths. Subsequently, a boundary between the writing line and a paper surface was observed by magnifying the boundary 200 times with a microscope. At this time, the number of bleedings per 1 cm of a written line was visually confirmed along a paper fiber. Each bleeding has a concave-convex or beard-like shape extending transversally by 0.01 mm or more than the average value of the writing line widths.

An effect of suppressing bleeding in each ink composition was evaluated by the number of confirmed bleedings. The effect of suppressing bleeding in each ink composition was evaluated as particularly good if the number of bleedings was 0 to 2, good if the number of bleedings was 3 to 6, and not good if the number of bleedings was 10 or more.

(Test for Bleed-Through of Writing Line to Paper)

Under the environment with the room temperature of 25° C. and humidity of 65%, the character of the Chinese numeral "—" illustrated in FIG. 6 was written in the square of the size of 2 cm×2 cm on the test paper described in 7.3 of JIS 56061, a cross-section of a writing line portion was made with a cutter knife, and a depth of ink penetration was measured by using a digital microscope (manufactured by KEYENCE CORPORATION, VI-IX-1000, 200-fold magnification).

An effect of suppressing bleed-through in each ink composition was evaluated by the measured depth of ink penetration. The effect of suppressing bleed-through in each ink composition was evaluated as particularly good if the depth of ink penetration was 12 µm or less, good if the depth of ink penetration was more than 12 µm and 20 µm or less, and not good if the depth of ink penetration was more than 20 µm.

(Writing Line Drying Property Test)

Figure 7:
FIG. 7 is a view illustrating a character used for a characteristic test for ink compositions according to Examples.

Under the environment with the room temperature of 25° C. and humidity of 65%, a character "永" illustrated in FIG. 7 was written in the square of the size of 2 cm×2 cm on the test paper described in 7.3 of JIS 56061, a time that elapsed before a paper surface did not get dirty any more when rubbing the character once with an eraser (high polymer, manufactured by Pentel Co., Ltd.) with a load of 500 gf.

With the load of 500 gf, it is possible to capture a phenomenon in which the quick-drying property is degraded by so-called ink dripping which is caused by ink lumped and applied onto a paper surface due to unstable ink discharge at the time of writing. It is thus possible to make an evaluation closer to actual use.

The drying property of each ink composition was evaluated in the above-described measured time. The drying property of each ink composition was evaluated as particularly good if the above-described time was 4 seconds or less, good if the above-described time was longer than 4 seconds and 16 seconds or less, and not good if the above-described time was more than 16 seconds.

(Temporal Stability Test)

For each Example and each Comparative Example, three refills for the above test ballpoint pen were stored for three months in a constant temperature reservoir at a room temperature of 50° C. and humidity of 30%, and then under the environment with the room temperature of 25° C. and humidity of 65%, the character "永" illustrated in FIG. 7 was written in the square of the size of 2 cm×2 cm on the test paper described in 7.3 of MS 56061.

An evaluation was made as follows.
clear writing line without blurring was obtained . . . o
writing line blurred and became unclear . . . x Tables 1 to 4 show results of the above-described tests.

In the ink compositions of Examples 1 to 22 each contain the two or more of diols and the acrylic resin, the two or more of diols including the first diol having from 5 to 7 carbon atoms and the second diol having from 1 to 4 carbon atoms, and the content of the first diol in the ink composition being 0.05 wt % or more, good or particularly good results were obtained in any of the tests: the bleeding property verification test resulted in 0 to 6 bleedings, the bleed-through test resulted in the depth of ink penetration of 7 µm or more and 13 µm or less, and the drying property test resulted in the measured time of 2 seconds or more and 10 seconds or less. That is, in the ink compositions of Examples 1 to 22, it was possible to achieve both the quick-drying property (drying property test) and bleed suppression (bleeding property test and bleed-through test) of ink.

The ink compositions of Examples 1 to 22 each contain two or more of diols different in permeability, and the two or more of diols include the first diol having from 5 to 7 carbon atoms and the second diol having from 1 to 4 carbon atoms, and the content of the first diol in each ink composition is 0.05 wt % or more. It is thus considered that ink permeability was properly controlled so that bleed-through to the paper surface and bleeding could be suppressed while maintaining the good quick-drying property (drying property) of the liquid component of the ink. In addition, the ink compositions of Examples 1 to 22 each further contain the particles of the acrylic resin. It is thus considered that diffusion of the carbon black and/or organic pigment could be suppressed, and ink bleed could effectively be suppressed. The diffusion was caused by adhering and fixing the particles of the acrylic resin to the paper surface, and making the liquid component of the ink penetrate into the paper surface when writing on the paper surface.

In contrast, even though the ink compositions of Comparative Examples 1 and 3 to 6 without dial having from 5 to 7 carbon atoms contain the particles of the acrylic resin, poor results were obtained in any of the tests: the bleeding property verification test resulted in 10 bleedings, the bleed-through test resulted in the depth of ink penetration of 25 μm or more, and the drying property test resulted in the measured time of 23 seconds or more.

It is considered that the result of the quick-drying property test was not good in each of the ink compositions of Comparative Examples 1 and 3 to 6 because the content of the first diol having a relatively good quick-drying property was less than 0.05 wt %. (In Examples 1 to 22, the content of the first dial is 5.0 wt % or more and 25.0 we % or less). On the other hand, even if the content of the first diol is increased to improve the quick-drying property of the ink, it is expected that the first diol having an excellent permeability worsens the results of the bleeding test and bleed-through test. For those reasons, it is considered difficult to achieve both the drying-property and bleed suppression of the ink composition if only one of diol, or the first diol is used.

In Comparative Example 2, the result of the writing line drying property test was not good even though the ink composition properly contains the two of diols and the particles of the acrylic resin. This is because an added resin is not a polysaccharide, resulting in an uneven writing line, and so-called ink dripping which is caused by ink lumped and applied onto the paper surface.

In addition, because a used resin is not a polysaccharide, it is impossible to form a composite state in which the carbon black and/or the organic pigment enters the resin, and thus the pigment hardly remains on the paper surface, worsening the results of the bleeding property verification test and test for bleed-through of the writing line to paper.

In Comparative Example 7, the ink composition does not contain the second diol although it uses the first diol and an acrylic resin in combination, resulting in bad compatibility between the first diol and the acrylic resin. Consequently, dispersion of the carbon black and/or organic pigment became unstable, dripping occurred at the time of writing, delaying the permeability, the writing line was likely to bleed, and temporal stability was worsened.

Embodiments of the present invention were described in detail above, but the present invention is not limited thereto, and various amendments and modifications may be implemented.

As used herein, the expressions indicating equivalence between matters such as "identical", "equal" and "uniform" represent not only the state of strict equality but also the state of tolerance or presence of a difference that provides the same functions.

As used herein, the expressions "comprising", "containing" or "having" one constitutional element is not an exclusive expression that excludes the presence of other constitutional elements.

REFERENCE SIGNS LIST

1 Ballpoint pen tip
2 Ball
3 Ball holder
4 Through-hole
5 Tip holder
6 Ink storage tube
7 Ink
8 Ink backward-flow preventing agent
9 Coil spring
10 Float
11 Ball housing part
12 Middle hole
13 Rear hole
14 Inward projection
15 Distal opening
16 Radial groove
17 Ball receiving seat
18 Shaft tube
19 Front shaft
20 Rear shaft
21 Crown
22 Knob
23 Rotor
24 Snapping member
25 Clip
100 Writing instrument
200 Refill
300 Extrapolation body
A Ball diameter
B Distal opening diameter
C Distal opening gap width
D Ball projection length
E Back and forth direction ball displacement
F Ball house part diameter
G Cleaner diameter
H Middle hole diameter
I Middle hole length
J Rear hole diameter
K Radial groove width
L Distal portion outer diameter
M Spherical receiving seat outer diameter
N Radial groove diameter
O Radial groove depth
α Caulking angle
β Ball receiving seat opening angle

The invention claimed is:

1. An ink composition comprising:
a carbon black and/or an organic pigment;
water;
a polysaccharide;
two or more of diols; and
particles of an acrylic resin,
wherein the two or more of diols include:
  a first diol having from 5 to 7 carbon atoms; and
  a second diol having from 1 to 4 carbon atoms, and
wherein a content of the first diol in the ink composition is 8.0 wt % or more and 22.0 wt % or less,
wherein a content of the second diol in the ink composition is 4.0 wt % or more and 8.0 wt % or less, and
wherein a ratio of the content of the first diol to the content of the second diol in the ink composition is 1.5 or more and 5.0 or less.

2. The ink composition according to claim 1,
wherein a content of the two or more of diols in an organic solvent used for the ink composition is 50.0 wt % or more.

3. The ink composition according to claim 1,
wherein the first diol is an alkanediol having from 5 to 6 carbon atoms, and
wherein the second diol is an alkanediol having from 2 to 4 carbon atoms.

4. The ink composition according to claim 1,
wherein an average particle size of the particles of the acrylic resin is 0.04 μm or more and 0.10 μm or less.

5. The ink composition according to claim 1,
wherein the acrylic resin includes a styrene-acrylic acid resin.

6. The ink composition according to claim 1, wherein the particles of the acrylic resin have a solid acid value of 50 or more and less than 100.

7. The ink composition according to claim 1, wherein a ratio by weight of a content of the particles of the acrylic resin to a content of the two or more of dials in the ink composition is 0.0084 or more and 0.21 or less.

8. The ink composition according to claim 1, wherein a ratio by weight of a content of the particles of the acrylic resin to a content of the two or more of diols in the ink composition is 0.0084 or more and 0.05 or less.

9. The ink composition according to claim 1, further containing at least one of alumina, silicon carbide, chromium oxide, boron carbide, zircon, tungsten carbide, silica, diamond, aluminum nitride, or silicone nitride.

10. The ink composition according to claim 1, which has a viscosity of at least 50 mPa·s and at most 10,000 mPa·s at a temperature of 25° C. and at a shear rate of 0.35 $\sec^{-1}$, and a viscosity of at least 50 mPa·s and at most 1,000 mPa·s at a temperature of 25° C. and at a shear rate of 35 $\sec^{-1}$.

11. A writing instrument comprising:
a writing part; and
an ink storage part storing the ink composition according to claim 1,
wherein the writing instrument is configured such that the ink composition is supplied to the writing part from the ink storage part.

12. An ink composition comprising:
a carbon black and/or an organic pigment;
water;
a polysaccharide;
two or more of diols; and
particles of an acrylic resin,
wherein the two or more of diols include:
  a first diol having from 5 to 7 carbon atoms; and
  a second diol having from 1 to 4 carbon atoms,
wherein a content of the first diol in the ink composition is 5.0 wt % or more and 28.0 wt % or less,
wherein the first diol is 2-methylpentane-2,4-diol,
wherein the second diol includes ethylene glycol or propylene glycol, and
wherein the polysaccharide includes xanthan gum.

13. A method for producing an ink composition, comprising a step of dispersing, in water, a carbon black and/or an organic pigment, a polysaccharide, two or more of diols, and particles of an acrylic resin,
wherein the two or more of diols include a first diol having from 5 to 7 carbon atoms and a second diol having from 1 to 4 carbon atoms, and a content of the first diol in the ink composition is 8.0 wt % or more and 22.0 wt % or less, and a content of the second diol in the ink composition is 4.0 wt % or more and 8.0 wt % or less, and a ratio of the content of the first diol to the content of the second diol in the ink composition is 1.5 or more to 5.0 or less.

* * * * *